US006690348B2

(12) United States Patent
Sato et al.

(10) Patent No.: US 6,690,348 B2
(45) Date of Patent: Feb. 10, 2004

(54) TRANSMISSIVE COLOR LIQUID CRYSTAL DISPLAY

(75) Inventors: Tsuneo Sato, Tokyo (JP); Ichiro Furuki, Tokyo (JP); Masatoshi Takahashi, Tokyo (JP); Keiki Yamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 160 days.

(21) Appl. No.: 10/002,122

(22) Filed: Dec. 5, 2001

(65) Prior Publication Data

US 2002/0080105 A1 Jun. 27, 2002

(30) Foreign Application Priority Data

Dec. 27, 2000 (JP) ........................................ 2000-399145

(51) Int. Cl.[7] ................................................. G09G 3/36
(52) U.S. Cl. ........................................ 345/102; 345/88
(58) Field of Search ............................. 345/102, 87, 89, 345/98, 99, 100, 207, 690, 211; 349/61, 62, 63, 64, 65, 66, 68, 69

(56) References Cited

U.S. PATENT DOCUMENTS

| 4,618,216 | A | * | 10/1986 | Suzawa | 349/65 |
| 4,772,885 | A | * | 9/1988 | Uehara et al. | 349/71 |
| 4,793,691 | A | * | 12/1988 | Enomoto et al. | 349/71 |
| 4,799,050 | A | * | 1/1989 | Prince et al. | 349/71 |
| 5,121,233 | A | * | 6/1992 | Spencer et al. | 349/69 |
| 5,128,782 | A | * | 7/1992 | Wood | 349/61 |
| 5,504,597 | A | * | 4/1996 | Sprague et al. | 349/57 |
| 5,748,828 | A | * | 5/1998 | Steiner et al. | 385/146 |
| 5,966,112 | A | * | 10/1999 | Katagiri et al. | 345/104 |
| 6,239,851 | B1 | * | 5/2001 | Hatazawa et al. | 349/62 |
| 2002/0050974 | A1 | * | 5/2002 | Rai et al. | 345/102 |

FOREIGN PATENT DOCUMENTS

| JP | A8-122534 | 5/1996 |
| JP | A10-68948 | 3/1998 |

* cited by examiner

Primary Examiner—Xiao Wu
(74) Attorney, Agent, or Firm—Birch, Stewart, Kolasch & Birch, LLP

(57) ABSTRACT

A transmissive color liquid crystal display including a first liquid crystal section, a light-guiding element, a second liquid crystal section, and first and second liquid crystal drivers. The first liquid crystal section presents color images. The light-guiding element is situated behind the first liquid crystal section for orienting rays toward the first liquid crystal display section. The second liquid crystal section includes a plurality of zones capable of transmitting wavelength bands of external rays, respectively. The zones are selectively activated for introducing colored external rays through respective zones to the light-guiding element. The first liquid crystal driver controls the first liquid crystal section. While color-component data extracted from full color image data is input into the first liquid crystal driver in a time-division manner, the first liquid crystal driver activates and deactivates pixels on the first liquid crystal section for presenting images on the first liquid crystal display on the basis of the color-component data in time division manner. The second liquid crystal driver selectively activates the zones in the second liquid crystal section in time division manner for introducing colored external rays of which wavelength bands correspond to the color-component data through the zone to the light-guiding element for irradiating the images on the first liquid crystal section with the colored external rays in time division manner.

19 Claims, 18 Drawing Sheets

TRANSMISSIVE COLOR LIQUID CRYSTAL DISPLAY

BACKGROUND OF THE INVENTION

1. Field of the Invention

The present invention relates to a transmissive color liquid crystal display utilizing the color field sequential method.

2. Prior Art

FIG. 18 is a cross sectional view of a backlight used in a conventional transmissive liquid crystal display disclosed in JP-A-8-122534. In FIG. 18, numeral 101 designates a backlight 101 including a light-guiding plate 102, a reflection layer 103 disposed on the rear surface of the light-guiding plate 102, a diffusion layer 104 disposed on the front surface of the light-guiding plate 102, a linear light source 105 disposed in the vicinity of a side edge of the light-guiding plate 102, and a reflector 106 surrounding the linear light source 105. Numeral 107 designates an open side edge of the light-guiding plate 102 opposite to the linear light source 105. The open side edge 107 is exposed and closed by a shutter plate 108 arranged pivotally about an axis 108a. On a surface of the shutter plate 108, which may face to the open side edge 107, a reflection film 109 is disposed.

Next, an operation of the backlight 101 will be described. The shutter plate 108 is opened so as to expose the open side edge 107 in the use of the liquid crystal display in the situation where environmental illumination is sufficient, for example, the outdoors. The rays from the linear light source 105, which will be referred to as internal rays hereinafter, enter light-guiding plate 102 directly from the linear light source 105 or indirectly after reflection on the reflector 106. While some fractions of internal rays leak out from open side edge 107, external rays including the rays of the sun enter the light-guiding plate 102 through the open side edge 107, and the incoming external rays are in excess of internal rays outgoing through the open side edge 107. Some fractions of internal and external rays in the light-guiding plate 102 reflect at the reflection layer 103 so as to be oriented frontward. Internal and external rays in the light-guiding plate 102 finally outgoes from the backlight 101 uniformly along the direction indicated by arrow A while the rays are diffused by the diffusion layer 104.

The shutter plate 108 is closed so as to cover the open side edge 107 in the use of the liquid crystal display when environmental illumination is insufficient, for example, in a house since external rays entering through the open side edge 107 are less than internal rays outgoing through the open side edge 107 if shutter plate 108 is open. Only internal rays from the reflector 106 enter light-guiding plate 102 directly from the linear light source 105 or indirectly after reflection on the reflector 106. Some fractions of internal rays reflect on the reflection film 109 and return into the light-guiding plate 102. Some fractions of internal rays in the light-guiding plate 102 reflect at the reflection layer 103 so as to be oriented frontward. Internal rays in the light-guiding plate 102 finally outgoes from the backlight 101 uniformly along the direction indicated by arrow A while the rays are diffused by the diffusion layer 104.

JP-A-8-122534 also discloses a modified backlight comprises a special reflection mirror at the open side edge 107. The reflection mirror has a transmittance property that varies depending upon angles of incidence of rays, whereby the mirror reflects rays inside the light-guiding plate 102, but admits external rays to the light-guiding plate 102.

JP-A-8-122534 discloses another modified backlight comprises a detector for detecting the illumination of external rays, and drive means, e.g., a motor, for opening and closing the open side edge 107 automatically in response to the environmental illumination.

FIG. 19 is a cross sectional view of another conventional transmissive liquid crystal display disclosed in JP-A-10-68948. In FIG. 19, numeral 201 designates a transmissive liquid crystal display including a liquid crystal display panel assembly 202, a fenestra 203 formed in the housing (not shown) of the liquid crystal display and disposed in the vicinity of the liquid crystal display panel assembly 202, a first light-guiding path 204 arranged behind the liquid crystal display panel assembly 202, a lamp unit 205 disposed in the vicinity of the side end of the first light-guiding path 204, and a second light-guiding path 206 for guiding external rays passing through the fenestra 203 to the first light-guiding path 204. Numeral 207 identifies a shutter plate for opening and closing the fenestra 203. A diffusion layer 208 is disposed on the rear surface of the first light-guiding path 204. Low-reflectance films 209 cover the front surface of the liquid crystal display panel assembly 202 and the fenestra 203, respectively. Reflection films 210 are disposed on the internal walls of the second light-guiding path 206 and on the internal wall of the shutter plate 207, respectively.

Next, an operation of the transmissive liquid crystal display 201 will be described. The lamp unit 205 is turned off and the shutter plate 207 is opened so as to expose the fenestra 203 in the use of the liquid crystal display when the environment is sufficiently bright. In this case, external rays including the rays of the sun enter the second light-guiding path 206 through the fenestra 203. While some fractions of external rays reflect on the reflection film 210 on the inner walls of the second light-guiding path 206, external rays reach the first light-guiding path 204. Then, the back surface of the liquid crystal display panel assembly 202 is irradiated with external rays uniformly while the diffusion layer 208 diffuses external rays.

On the contrary, the lamp unit 205 is turned on when the environmental illumination is insufficient. Accordingly, the rays from the lamp unit 205, which will be referred to as internal rays hereinafter, enters first light-guiding path 204. In addition, the shutter plate 207 is shut to close the fenestra 203 since the illumination required for irradiating the liquid crystal cannot be ensured if internal rays quit through the second light-guiding path 206 and the fenestra 203. Another reason for closing the shutter plate 207 is for protecting unanticipated external rays from the fenestra 203 that may directly come into human eyeshot, causing difficulty to watch the display panel. By the closed arrangement, internal rays that have entered the second light-guiding path 206 reflect on the reflection film 210 on the shutter plate 207 to return to the second light-guiding path 206, reflect on the reflection film 210 on the inner wall of the second light-guiding path 206, and enter the first light-guiding path 204, again. Internal rays that have entered the first light-guiding path 204 are diffused by the diffusion layer 208 and shine up the reverse side of the liquid crystal display panel assembly 202 uniformly.

JP-A-10-68948 also discloses a modified structure comprising a light-collecting element for collecting external rays, an optical fiber for guiding external rays collected by the light-collecting element to the fenestra 203, and a coupling element for coupling the optical fiber with the fenestra 203.

The conventional transmissive liquid crystal display shown in FIG. 18 has a drawback that primary color components, e.g., R (red), G (green), and B (blue) cannot be extracted from external rays admitted through the open side edge 107. Therefore, when external rays are employed, full color images are not presented on the liquid crystal display panel assembly without provision of color filters.

In addition, the conventional transmissive liquid crystal display shown in FIG. 18 has another drawback that it is not easy to control the entrance of external rays and the leak of the internal ray since the control of the entrance of external rays and the leak of the internal ray is achieved by adjusting the shutter plate 108.

Similarly, the transmissive liquid crystal display shown in FIG. 19 has a drawback that primary color components, e.g., R, G, and B cannot be extracted from external rays that have passed through the fenestra 203. Therefore, when external rays are employed, full color images are not presented on the liquid crystal display panel assembly without provision of color filters.

In addition, the conventional transmissive liquid crystal display shown in FIG. 19 has another drawback that it is not easy to control the entrance of external rays and the leak of the internal ray since the control of the entrance of external rays and the leak of the internal ray is achieved by adjusting the shutter plate 207.

SUMMARY OF THE INVENTION

It is therefore an object of the present invention to provide a transmissive color liquid crystal display that can present color images using external rays and can readily control the entrance of external rays and the leak of the internal ray.

In accordance with an aspect of the present invention, a transmissive color liquid crystal display includes a first liquid crystal section, a light-guiding element, a second liquid crystal section, and first and second liquid crystal drivers. The first liquid crystal section presents color images. The light-guiding element is situated behind the first liquid crystal section for orienting rays toward the first liquid crystal display section. The second liquid crystal section includes a plurality of zones capable of transmitting wavelength bands of external rays, respectively, the zones may be selectively activated for introducing colored external rays through respective zones to the light-guiding element. The first liquid crystal driver controls the first liquid crystal section. While color-component data extracted from full color image data is input into the first liquid crystal driver in a time-division manner, the first liquid crystal driver activates and deactivates pixels on the first liquid crystal section for presenting images on the first liquid crystal display section on the basis of the color-component data in time division manner. The second liquid crystal driver selectively activates the zones in the second liquid crystal section in time division manner for introducing colored external rays of which wavelength bands correspond to the color-component data through the zone to the light-guiding element for irradiating the images on the first liquid crystal section with the colored external rays in time division manner.

With such a structure, the second liquid crystal section is used for changing the color of introduced external rays, thereby changing the color of the image on the first liquid crystal section sequentially. Therefore, color images can be presented on an image display section of a liquid crystal display panel without provision of color filters using external rays.

In an embodiment, the first and second liquid crystal sections may be parts of a single liquid crystal display panel assembly. The zones of the second liquid crystal sections may be respectively provided with color filters capable of selectively transmitting color components of external rays, each of the color components having a wavelength band corresponding to the color-component data. Thus, one of the color components are admitted through one of the zones and one of the color filters on the zone when the zone is activated by the second liquid crystal driver.

With such a structure, by virtue of the color filters on the second liquid crystal section, rays exhibiting color components, each having a wavelength band corresponding to the color-component data, can be obtained readily from external rays.

In another embodiment, the transmissive color liquid crystal display may further comprise a prism for dispersing external rays into visible spectrum exhibiting color components. The spectrum resulting from external rays by the prism may strike the second liquid crystal section, whereby one of the color components are admitted through one of the zones of the second liquid crystal section when the zone is activated by the second liquid crystal driver.

With such a structure, by virtue of the prism, rays exhibiting color components, each having a wavelength band corresponding to the color-component data, can be obtained readily from external rays.

The transmissive color liquid crystal display may further comprise a slit plate facing to the second liquid crystal section. The slit plate may be provided with a plurality of apertures of which the positions respectively correspond to the zones of the second liquid crystal section, whereby one of the color components are admitted through one of the apertures and one of the zones of the second liquid crystal section when the zone is activated by the second liquid crystal driver.

With such a structure, since the positions of the narrow apertures correspond to the wavelength bands of external rays admitted to the light-guiding element, the wavelength bands are narrower so that clear color images may be presented and the resultant full color image may exhibit an improved reality. In addition, the design can be changed easily for matching the wavelength bands with various sorts of color component data.

The transmissive color liquid crystal display may further comprise a third liquid crystal section activated for introducing external rays through the third liquid crystal section to the prism, and a third liquid crystal driver for controlling the third liquid crystal section. The first and third liquid crystal sections may be parts of a single liquid crystal display panel assembly.

With such a structure, the third liquid crystal section may be used for introduction and shutoff of external rays, so that the intensity of external rays can be controlled readily by the third liquid crystal driver.

The transmissive color liquid crystal display may further comprise a light source unit disposed near the light-guiding element. The light source unit is capable of emitting colored internal rays, of which a wavelength band corresponds to the color-component data, introduced to the light-guiding element for irradiating the images on the first liquid crystal section with the colored external rays in a time division manner.

With such a structure, color images can be presented on an image display section of a liquid crystal display panel without provision of color filters using internal rays.

The transmissive color liquid crystal display may further comprise a battery charge monitor for detecting remaining charge of a battery for driving the transmissive color liquid crystal display, and an external-ray controller for controlling to use external rays when the battery charge monitor detects that the remaining charge is less than the threshold.

With such a structure, the remaining charge of the battery may be efficiently utilized for presenting color images since external rays are controlled on the basis of the remaining charge.

In an embodiment, the transmissive color liquid crystal display may further comprise a light source unit and a half-mirror. The light source unit may be positioned at the same side of the light-guiding element as that where the second liquid crystal section is positioned. The light source unit may be disposed near the light-guiding element and may be capable of emitting colored internal rays, of which a wavelength band corresponds to the color-component data, introduced to the light-guiding element for irradiating the images on the first liquid crystal section with the colored external rays in a time division manner. The light source unit may be positioned at the same side of the light-guiding element as that where the second liquid crystal section is positioned. The half-mirror may be situated between the light-guiding element and the light source unit. The half-mirror may reflect external rays, which have passed through the second liquid crystal section, toward the light-guiding element and may transmit internal rays emitted from the light source unit toward the light-guiding element.

With such a structure, internal rays hardly leak out from the second liquid crystal section that is an intake of external rays, so that full color images are prevented from hazing.

In an embodiment, the transmissive color liquid crystal display may further comprise a light detector for measuring a sum of intensity of internal rays and external rays of each color component within the light-guiding element, and a light intensity optimizer for controlling the light source unit on the basis of the sum of the intensity measured by the light detector, so as to adjust the intensity of internal rays.

With such a structure, the sum light intensity of internal and external rays of each color component may be maintained constant although the intensity of external rays varies.

In another embodiment, the transmissive color liquid crystal display may further comprise a light detector for measuring a sum of intensity of internal rays and external rays of each color component within the light-guiding element, and a light intensity optimizer for controlling the second liquid crystal section on the basis of the sum of the intensity measured by the light detector, so as to adjust the intensity of introduced external rays.

With such a structure, the sum light intensity of internal and external rays of each color component may be maintained constant although the intensity of external rays varies.

In an embodiment, the light-guiding element may include a first light-guiding element, to which internal rays are admitted, and a second light-guiding element, to which external rays are admitted. The transmissive color liquid crystal display may further comprise a reflection film mounted on a side end surface of the first light-guiding element opposing to a side to which internal rays are admitted.

With such a structure, although some fractions of internal rays progress longitudinally through the first light-guiding element, the fractions of internal rays return to the first light-guiding element by the reflection film, whereby efficiency of internal rays may be enhanced.

The first liquid crystal section may be situated in front of the first light-guiding element while the first light-guiding element may be situated in front of the second light-guiding element.

With such a structure, efficiency of internal rays may be enhanced.

In another embodiment, the first liquid crystal section may be situated in front of the second light-guiding element while the second light-guiding element may be situated in front of the first light-guiding element.

With such a structure, efficiency of external rays may be enhanced.

In an embodiment, the transmissive color liquid crystal display may further comprise a half-mirror situated between the first light-guiding element and the second light-guiding element. The half-mirror may reflect internal rays admitted to the first light-guiding element and may transmit external rays admitted to the second light-guiding element.

With such a structure, efficiency of internal rays may be enhanced.

In another embodiment, the transmissive color liquid crystal display may further comprise a half-mirror situated between the first light-guiding element and the second light-guiding element. The half-mirror may reflect external rays admitted to the second light-guiding element and may transmit internal rays admitted to the first light-guiding element.

With such a structure, efficiency of external rays may be enhanced.

In an embodiment, the light source unit may include a plurality of linear light sources.

With such a structure, each light source can irradiate the side end surface of the light-guiding element entirely with internal rays having relatively high intensity and the light source unit can have a small thickness.

In another embodiment, the light source unit may include a plurality of point light sources.

With such a structure, the transmissive color liquid crystal display may be manufactured in a small size and be operated at a low cost.

In another embodiment, the light source unit may include a plurality of surface light sources.

With such a structure, internal rays with high brightness may be employed for presenting full color images.

In accordance with another aspect of the present invention, a transmissive color liquid crystal display includes a liquid crystal display panel assembly, a light-guiding element, a first liquid crystal driver, a second liquid crystal driver, and a color selecting mechanism. The liquid crystal display panel assembly may include an image display section for presenting color images and an external-ray transmissive section activated for introducing external rays through the external-ray transmissive section to the light-guiding element. The light-guiding element may be situated behind the image display section for orienting rays toward the image display section. The first liquid crystal driver may control the image display section. Color-component data extracted from full color image data may be input into the first liquid crystal driver in a time-division manner. The first liquid crystal driver may activate and deactivate pixels on the image display section for presenting images on the image display section on the basis of the color-component data in time division manner. The second liquid crystal driver may activate the external-ray transmissive section for introducing external rays through the external-ray transmissive section. The color selecting mechanism may select colors of external rays in time division manner for introducing colored external rays of which wavelength bands correspond to the color-component data to the light-guiding element for irradiating the images on the image display section with the colored external rays in time division manner.

With such a structure, external rays are introduced by the external-ray transmissive section that is integral with the liquid crystal display panel assembly having image display section. The color selecting mechanism is used for changing the color of introduced external rays, thereby changing the color of the image on the image display section sequentially. Therefore, color images can be presented on the image display section of the liquid crystal display panel without provision of color filters using external rays.

BRIEF DESCRIPTION OF THE DRAWINGS

With reference to the accompanying drawings, various embodiments of the present invention will be described hereinafter. In the drawings.

DETAILED DESCRIPTION OF PREFERRED EMBODIMENTS

First Embodiment

Figure 1:
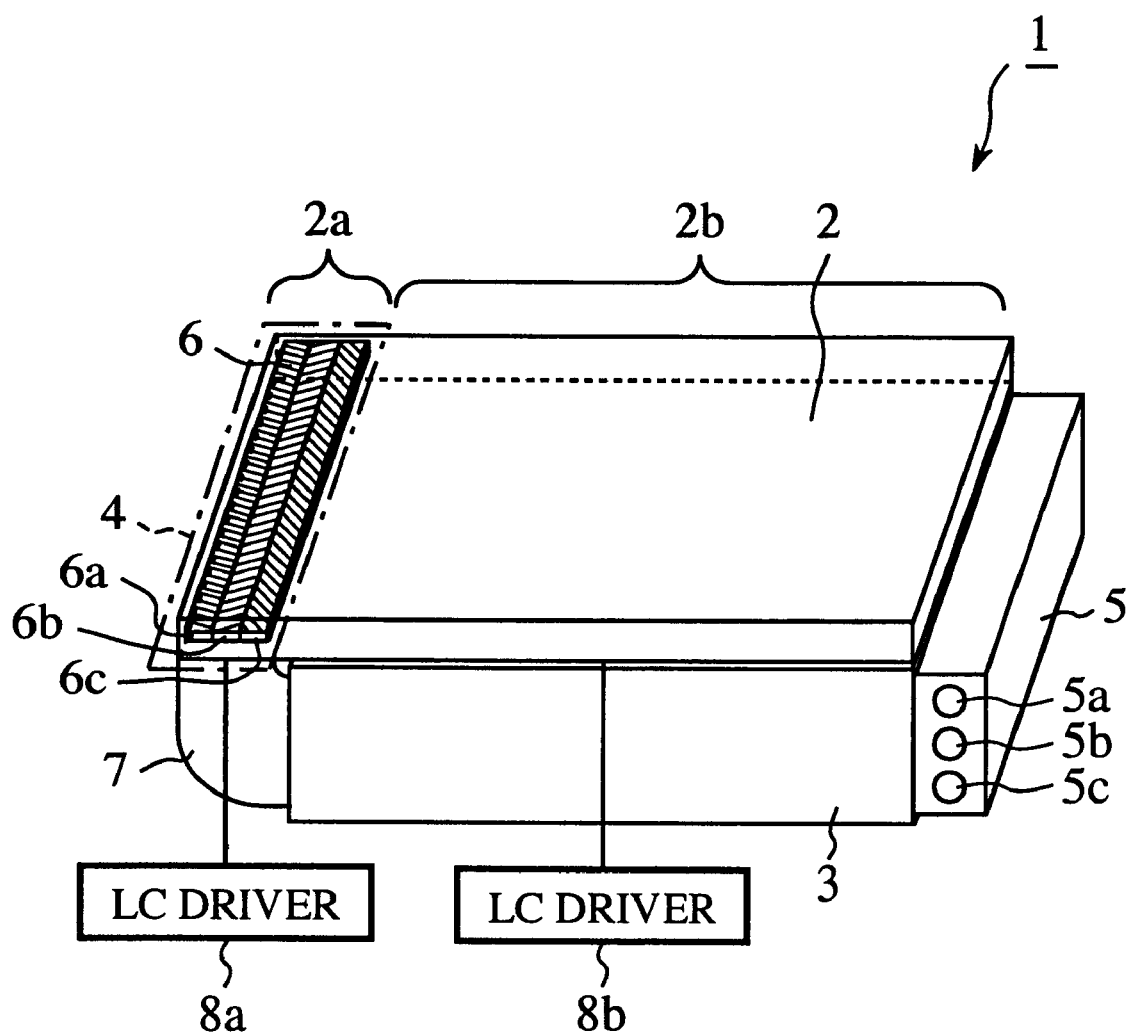
FIG. 1 is a perspective view showing a transmissive color liquid crystal display according to a first embodiment of the present invention.

FIG. 1 is a perspective view showing a transmissive color liquid crystal display according to a first embodiment of the present invention. In FIG. 1, numeral 1 designates the transmissive color liquid crystal display including a liquid crystal display panel assembly 2, a light-guiding element 3 arranged behind the liquid crystal display panel assembly 2, and a fenestra 4 formed in the housing (not shown) of the liquid crystal display and disposed in the vicinity of the display section of the housing where liquid crystal display panel assembly 2 is exposed. External rays pass through the fenestra 4 into the inside of the liquid crystal display. A light source unit 5 is disposed in the vicinity of the side end surface of the light-guiding element 3.

A color filter unit 6 is disposed inside the liquid crystal display panel assembly 2. The color filter unit 6 permits certain wavelength bands of external rays that are substantially the same as wavelength bands of internal rays emitted by the light source unit 5 to pass. An auxiliary light-guiding element 7 guides external rays, which have passed through a section of the liquid crystal display panel assembly 2 where the color filter unit 6 is provided, into a side end surface of the light-guiding element 3 where the light source unit 5 is not situated.

The liquid crystal display panel assembly 2 may be separated into two sections: an external-ray transmissive section 2a, within which the color filter unit 6 is disposed and through which external rays may pass; and an image display section 2b, within which the color filter unit 6 is not disposed and on which color images may be presented. The external-ray transmissive section 2a and the image display section 2b are connected with and driven by respective liquid crystal (LC) drivers 8a and 8b.

The light-guiding element 3 orients internal and external rays, which have entered through the side end surfaces of the light-guiding element 3, frontward to irradiate the image display section 2b of the liquid crystal display panel assembly 2 uniformly. The light-guiding element 3 is preferably made of a bar or plate made from acrylic resin or other suitable transparent materials.

The light source unit 5 comprises a plurality of linear light sources 5a, 5b, and 5c, each of which is capable of emitting internal rays of which the wavelength band correspond to color-component data, which will be described later. The linear light sources preferably include an R (red) light source 5a, a G (green) light source 5b, and a B (blue) light source 5c. The linear light sources are preferably selected from an LED (light emitting diode) and an EL (electroluminescence) element. In accordance with the LED or EL element, the wavelength band of the rays emitted therefrom may be matched with a target wavelength band by controlling adulterants doped in the manufacturing process.

The color filter unit 6 is disposed in such a manner that the color filter unit 6 can be seen entirely through the fenestra 4. The color filter unit 6 comprises filters, each of which is capable of transmitting external rays of which the wavelength band correspond to color-component data, which will be described later. The color filter unit 6 preferably includes an R (red) filter 6a, a G (green) filter 6b, and a B (blue) filter 6c.

Next, an operation of the transmissive color liquid crystal display 1 will be described. In the first embodiment of the transmissive color liquid crystal display 1, the liquid crystal driver 8b for driving the image display section 2b of the liquid crystal display panel assembly 2 is provided with different color component data at different time moments in a time-division manner for displaying full color images on the image display section 2b of the liquid crystal display panel assembly 2. For this purpose, full color image data is divided into a plurality sorts of color-component data, e.g., three primary color-component data: R data, G data, and B data that are sequentially supplied to the liquid crystal driver 8b. Each sort of color-component data describes an indication of the color and the positions that should be presented with the color. For example, R data describes an indication of red and the positions that should be presented with red.

On the basis of the color-component data, the liquid crystal driver 8b selectively activates corresponding pixels on the image display section 2b of the liquid crystal display panel assembly 2 to make the pixels transparent while the liquid crystal driver 8b deactivates other pixels on the image display section 2b to make these pixels opaque. The activation/deactivation control is achieved by causing phase transition of the liquid crystal since polarizing films are disposed on both sides of the liquid crystal display panel assembly 2.

The above-described operation is commonly executed when internal or external rays are exclusively utilized and when internal and external rays are utilized together for displaying images.

In the following, operations inherent in the use of internal rays, external rays, and internal and external rays will be described.

Figure 3:
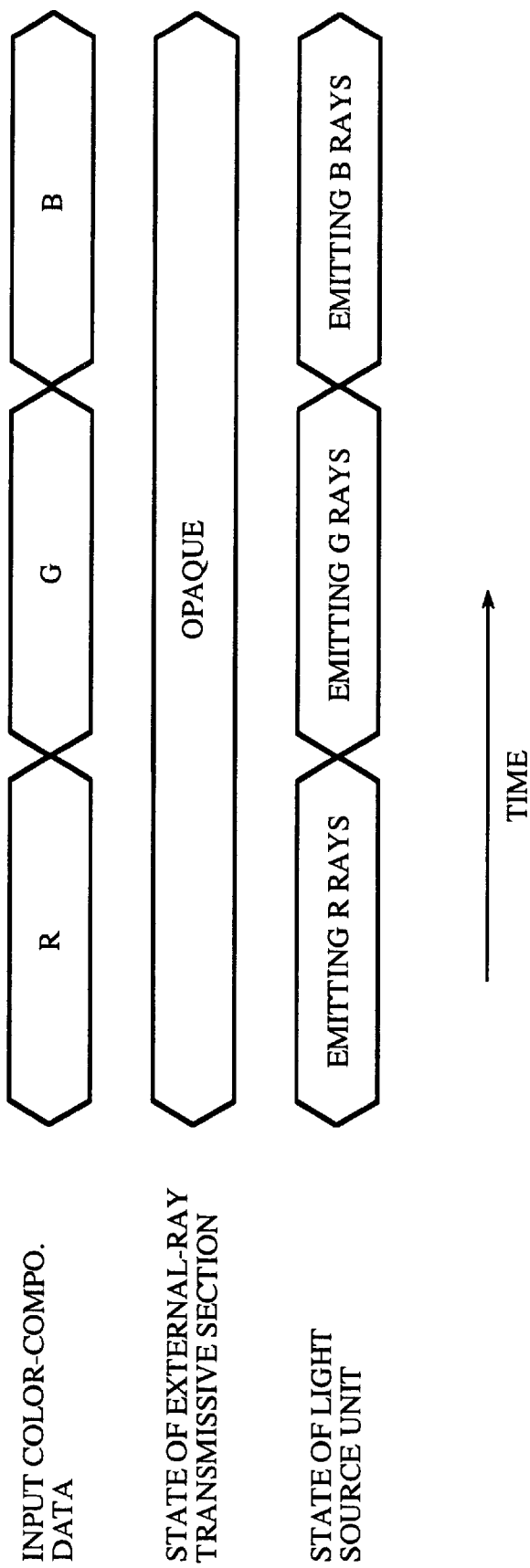
FIG. 3 is a time chart showing an operation of the transmissive color liquid crystal display shown in FIG. 1 when internal rays are used for displaying color images.

First, an operation in the use of internal rays exclusively will be described with reference to FIG. 3. The light source unit 5 is turned on, so that the constituent light sources 5a, 5b, and 5c emits internal rays alternatively and sequentially in response to the color-component data varying in time division manner. For example, when R data is input into the liquid crystal driver 8b for driving the image display section 2b, the R light source 5a emits red rays. When G data is input into the liquid crystal driver 8b, the G light source 5b emits green rays. When B data is input into the liquid crystal driver 8b, the B light source 5c emits blue rays. Accordingly, internal rays corresponding to the input color-component data enter the light-guiding element 3, so that an image corresponding to the input color-component data is represented on the image display section 2b of the liquid crystal display panel assembly 2.

The color of the image displayed on the image display section 2b varies cyclically in response to the input color-component data, leaving afterimages on human eyes to cause a full color illusion where colors are blended. In other words, when R data is input into the liquid crystal driver 8b for driving the image display section 2b, an R frame of image is presented for an instant. When G data is input into the liquid crystal driver 8b, a G frame of image is presented for an instant. When B data is input into the liquid crystal driver 8b, a B image is represented for an instant. The change of color at every moment causes a full color illusion where colors are blended. Inputting the R, G, and B data into the liquid display driver 8b at different moments with a high speed sequentially may be referred to as inputting data into the liquid display driver 8b in a time-division manner.

In addition, when internal rays are exclusively employed, a liquid crystal driver 8a for driving the external-ray transmissive section 2a deactivates all pixels on the external-ray transmissive section 2a of the liquid crystal display panel assembly 2, so as to make the pixels opaque. Accordingly, the external-ray transmissive section 2a blocks internal rays that have passed through the light-guiding element 3 and the auxiliary light-guiding element 7 and prevents internal rays from going out through the fenestra 4.

Figure 4:
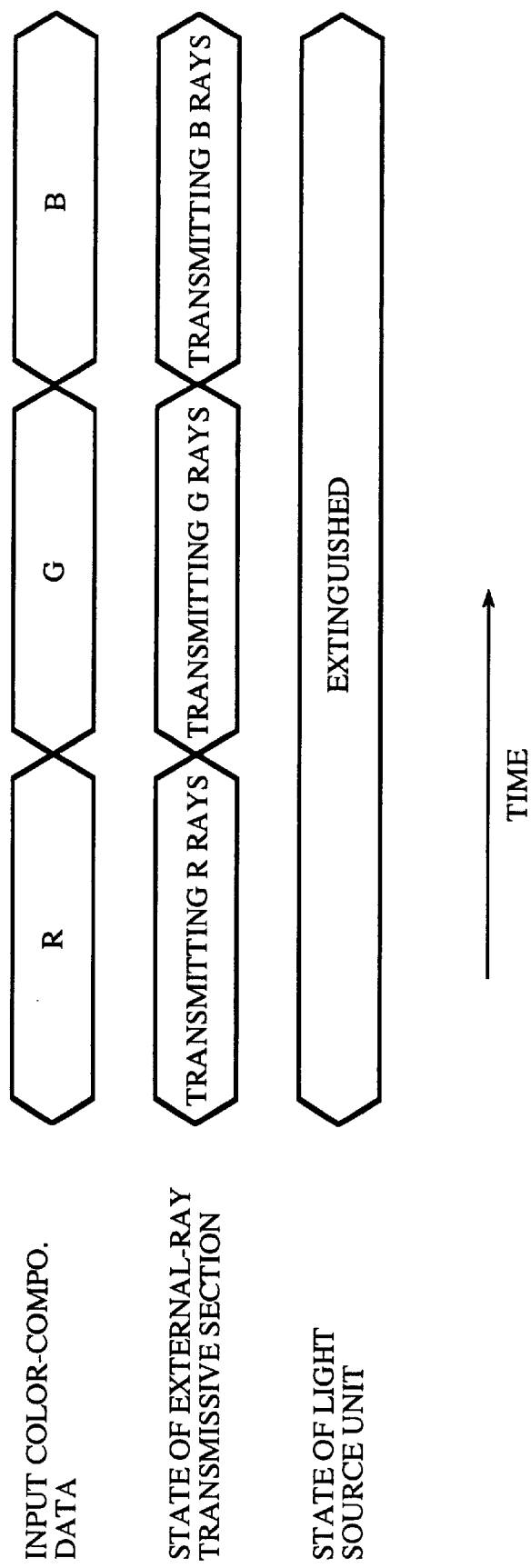
FIG. 4 is a time chart showing another operation of the transmissive color liquid crystal display shown in FIG. 1 when external rays are used for displaying color images.

Next, an operation in the use of external rays exclusively will be described with reference to FIG. 4. The light source unit 5 is extinguished. The liquid crystal driver 8a for driving the external-ray transmissive section 2a selectively activates pixels, which correspond to the input color-component data, on the external-ray transmissive section 2a of the liquid crystal display panel assembly 2, so as to make the pixels transmissive with respect to external rays of which the wavelength band corresponds to the input color-component data. Simultaneously, the liquid crystal driver 8a deactivates other pixels on the external-ray transmissive section 2a.

For example, when R data is input into the liquid crystal driver 8b for the image display section 2b, the liquid crystal driver 8a for driving the external-ray transmissive section 2a activates pixels, on which the R filter 6a is disposed, to make these pixels transparent. At the same time, the liquid crystal driver 8a deactivates other pixels, on which G and B filters 6b and 6c are disposed, to make these pixels opaque.

When G data is input into the liquid crystal driver 8b for the image display section 2b, the liquid crystal driver 8a for driving the external-ray transmissive section 2a activates pixels, on which G filter 6b is disposed, to make these pixels transparent. At the same time, the liquid crystal driver 8a deactivates other pixels, on which R and B filters 6a and 6c are disposed, to make these pixels opaque.

When B data is input into the liquid crystal driver 8b for the image display section 2b, the liquid crystal driver 8a for driving the external-ray transmissive section 2a activates pixels, on which B filter 6c is disposed, to make these pixels transparent. At the same time, the liquid crystal driver 8a deactivates other pixels, on which R and G filters 6a and 6c are disposed, to make these pixels opaque.

Therefore, external rays of a wavelength band corresponding to the up-to-date color-component data enter the light-guiding element 3 through the auxiliary light-guiding element 7, to display an image corresponding to the up-to-date color-component data on the image display section 2b, leaving an afterimage on human eyes to cause a full color illusion where colors are blended. Typically, external rays are sufficiently bright in comparison with internal rays and may make color images clearly visible on the image display section 2b without help of internal rays.

Figure 5:
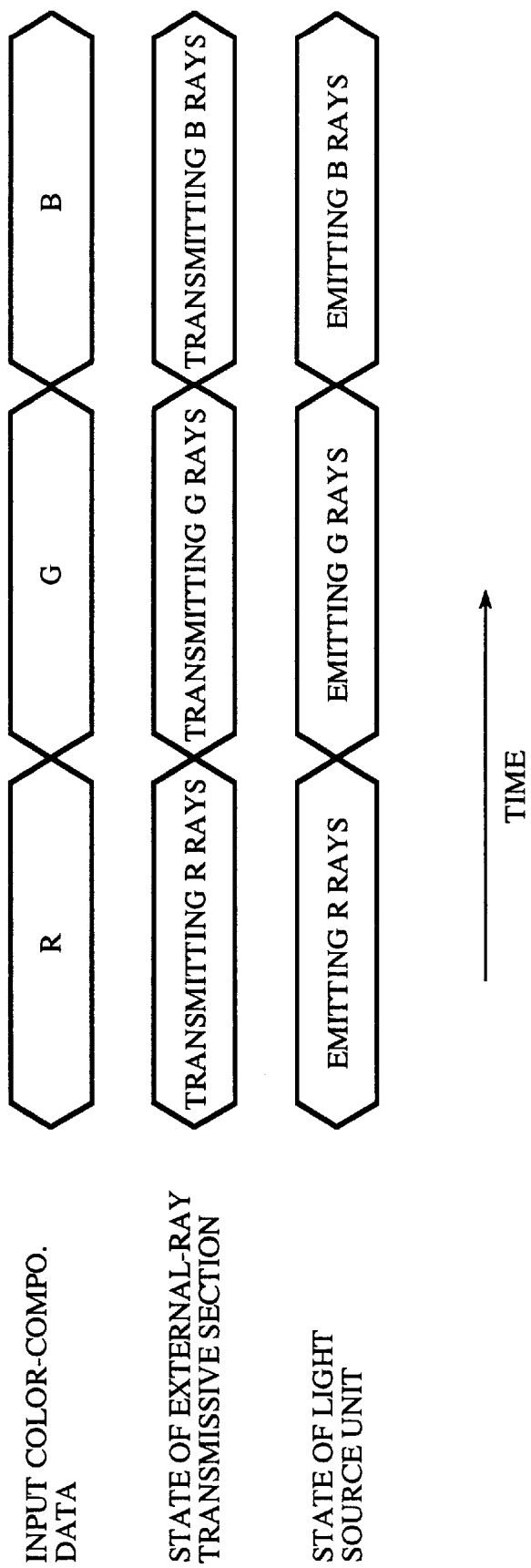
FIG. 5 is a time chart showing another operation of the transmissive color liquid crystal display shown in FIG. 1 when internal and external rays are used for displaying color images.

Next, an operation in the use of internal and external rays simultaneously will be described with reference to FIG. 5. As similar to the description of the exclusive use of internal rays, the light source unit 5 is turned on, so that the constituent light sources 5a, 5b, and 5c emits internal rays alternatively and sequentially in response to the color-component data varying in time division manner. In addition, the liquid crystal driver 8a for driving the external-ray transmissive section 2a selectively activates pixels, which correspond to the input color-component data, on the external-ray transmissive section 2a of the liquid crystal display panel assembly 2, so as to make the pixels transmissive with respect to external rays of which the wavelength band corresponds to the input color-component data. Simultaneously, the liquid crystal driver 8a deactivates other pixels on the external-ray transmissive section 2a.

Accordingly, both internal and external rays of a wavelength band corresponding to the up-to-date color-component data enter the light-guiding element 3, to display an image corresponding to the up-to-date color-component data on the image display section 2b, leaving an afterimage on human eyes to cause a full color illusion where colors are blended. This operation is carried out to make full color images clearly visible on the image display section 2b by virtue of both external and internal rays when either external or internal rays are not sufficient to show full color images.

Figure 2:
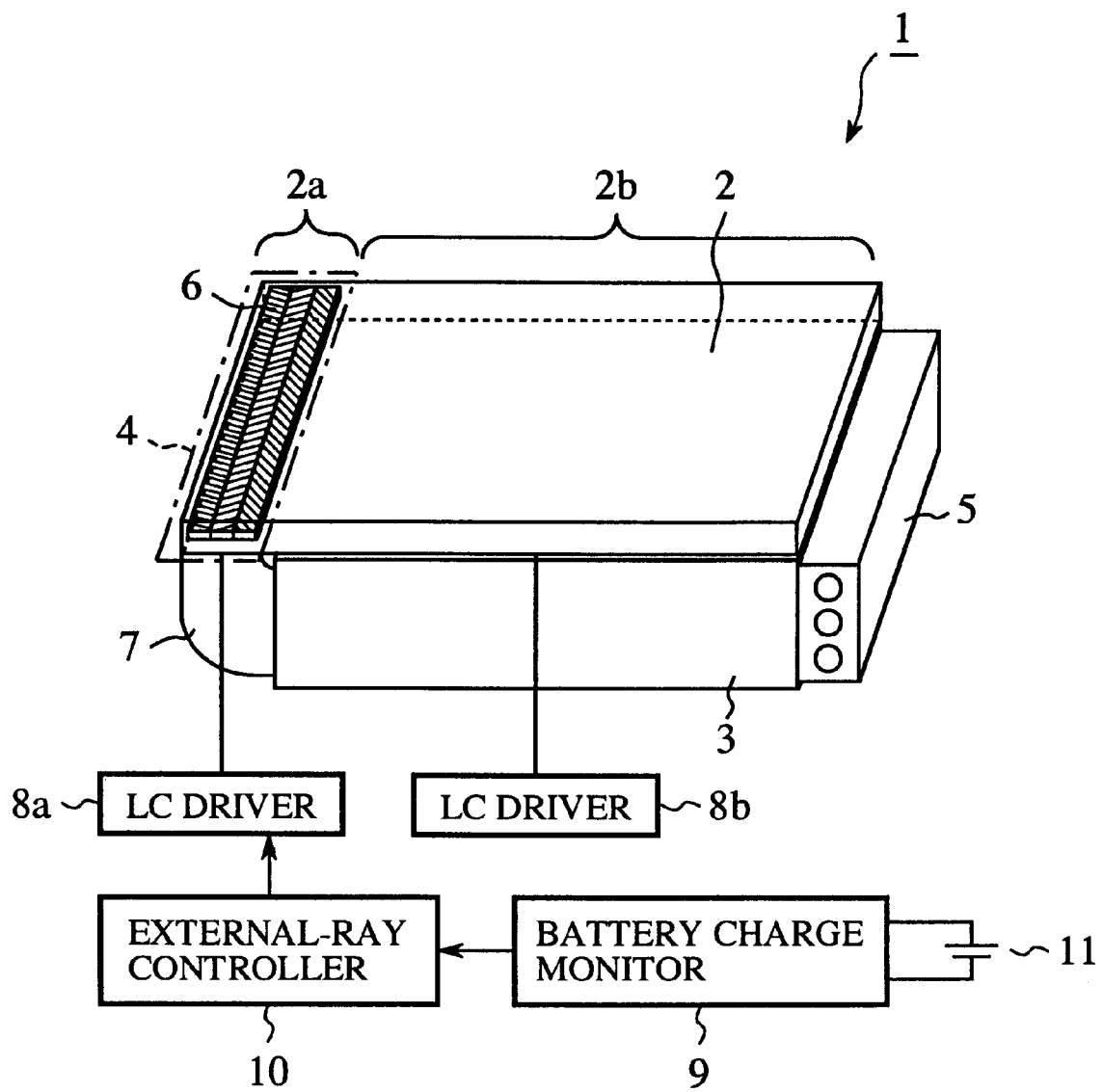
FIG. 2 is a perspective view showing a modification of the first embodiment of the present invention.

The turning manipulation of the LC driver 8a of the external-ray transmissive section 2a for introduction and shutoff of external rays and the turning manipulation of the light source unit 5 for emitting and extinguishing internal rays may be achieved manually with one or more manual switches or automatically. For example, as shown in FIG. 2, when the transmissive color liquid crystal display 1 is provided with and driven by electric power supplied from a battery 11, it is possible to provide a battery charge monitor 9 for detecting remaining charge of the battery 11 and an external-ray controller 10 for controlling the LC driver 8a to use external rays when the remaining charge is less than a threshold.

As described above, the LC driver 8a for the external-ray transmissive section 2a of the liquid crystal display panel assembly 2 controls activations/deactivations of pixels on the external-ray transmissive section 2a, so that external rays of the wavelength band responding to the input color-component data enters the light-guiding element 3 through the external-ray transmissive section 2a of the liquid crystal display panel assembly 2. Thus, according to the first embodiment of the present invention, full color images may be indicated on the image display section 2b of the liquid crystal display panel assembly 2 where no color filters are equipped, using external rays. The use of external rays may contribute to display full color images with a sufficient brightness and to reduce power consumption.

The entrance of external rays and the leak of the internal ray can be readily controlled since the entrance of external rays and the leak of the internal ray are controlled by the activations/deactivations of the pixels on the external-ray transmissive section 2a of the liquid crystal display panel assembly 2.

If used are the battery charge monitor 9 for detecting remaining charge of the battery 11 and the external-ray controller 10 for controlling the LC driver 8a to use external rays when the remaining charge is less than a threshold, the battery 11 may be utilized efficiently.

According to the first embodiment, the color filter unit 6 is arranged in the liquid crystal display panel assembly 2. However, a similar color filter unit may be provided outside the liquid crystal display panel assembly 2.

Furthermore, according to the first embodiment, the external-ray transmissive section 2a and the image display section 2b are comprised of a single liquid crystal display panel assembly 2. However, a similar external-ray transmissive section and a similar image display section may be realized by two liquid crystal panel assemblies, respectively.

Furthermore, although a plurality of micro pixels on the external-ray transmissive section 2a are activated and deactivated for varying the color to be displayed according to the first embodiment, it is not intended to limit the present invention to the control of the micro pixels. Rather, it can be contemplated that larger pixels, each of which has substantially the same superficial content as that of the color filters 6a, 6b, and 6c, cover the color filters, respectively. In this alteration, one of the large-sized pixels may be selectively activated for transmitting a required color while the others are deactivated for an instant. By this arrangement, fall of the aperture ration raised by a large number of pixels may be prevented.

Although the color-component data includes R data, G data, and B data according to the first embodiment, other combinations of color-component data may be employed. For example, a combination of halftone color data representing halftone colors may be employed.

Although the fenestra 4 is positioned in the vicinity of the display section of the housing where the image display section 2b is exposed in the first embodiment, it is not intended to limit the present invention to the disclosed embodiment. Such a fenestra may be positioned at other locations: a location where the fenestra does not make problems in displaying the image, or a suitable location in the appearance of the device. For example, a surrounding fenestra may be disposed to enclose on all sides of the display section. Alternatively, a fenestra may be positioned at the same side of the liquid crystal display panel assembly 2 as that where the light source unit 5 is positioned.

In the first embodiment, three color filters 6a, 6b, and 6c constituting the color filter unit 6 are integrally positioned within the single fenestra 4. However, respective color filters may be separately arranged, and accordingly, a plurality of fenestrae may be arranged for respective color filters.

Although the shape of the fenestra 4 is identical with that of the color filter unit 6 in the first embodiment, it is not intended to limit the present invention to such a configuration. The configuration of the fenestra may be altered to introduce external rays efficiently. For example, the internal wall of the fenestra may be tapered in such a fashion that the front edge of the fenestra has the largest cross section and the cross section gradually reduces rearward. In addition, the fenestra may be provided with a condenser lens.

Although the fenestra 4 is located closely to the color filter unit 6 in the first embodiment, it is not intended to limit the present invention to such a structure. In a modification, a fenestra may be separated from a color filter unit, and an optical fiber may be used to guide external rays from the fenestra to an external-ray transmissive section of a liquid crystal panel assembly where the color filter unit is disposed.

In another modification, two fenestrae may be located closely to and separated from a color filter, respectively. The fenestra close to the color filter unit directly introduces external rays to an external-ray transmissive section of a liquid crystal panel assembly where the color filter unit is disposed. The fenestra separated from the color filter unit indirectly introduces external rays to the external-ray transmissive section with help of an optical fiber.

Although the light source unit 5 includes three linear light sources 5a, 5b, and 5c arranged in an integral unit, it is not intended to limit the present invention to such a construction. The construction and the arrangement of the linear light sources may be altered in order that the quality of color image be improved and the size of device be reduced. For example, the number of light sources of a specified color or of all colors may be increased. Each of the linear light sources may be constructed in various forms, e.g., in a straight line or a turned line. Furthermore, the linear light sources may be arranged separately rather than integrally.

It is desirable that internal rays emitted from each light source of the light source unit 5 have the substantially same wavelength band as that of external rays passing through the corresponding filter of the color filter unit 6. However, the peak wavelength and the bandwidth of the emitted internal rays may be different from those of the transmitted external rays. On account of such tolerances, limitations in selection of the linear light sources and the color filters are eased to reduce the cost in manufacturing the device.

A suitable liquid crystal display used for liquid crystal display panel assembly 2 may be selected from an active matrix display, passive matrix display, and other suitable liquid crystal displays. For example, TFT (thin-film transistor), STN (super twisted nematic), TN (twisted nematic) liquid crystal displays may be suitably utilized.

The material of the color filter unit 6 may be constructed in any suitable phase, such as solid-state, sheet-type, liquid, and liquid crystal.

Second Embodiment

In the first embodiment, the external-ray transmissive section 2a of the liquid crystal display panel assembly 2 is located at the side of the light-guiding element 3 opposing to the light source unit 5. However, the external-ray transmissive section 2a may be located at the same side of the light-guiding element 3 as that where the light source unit 5 is positioned, as in a second embodiment of the present invention, which will be described below.

Figure 6:
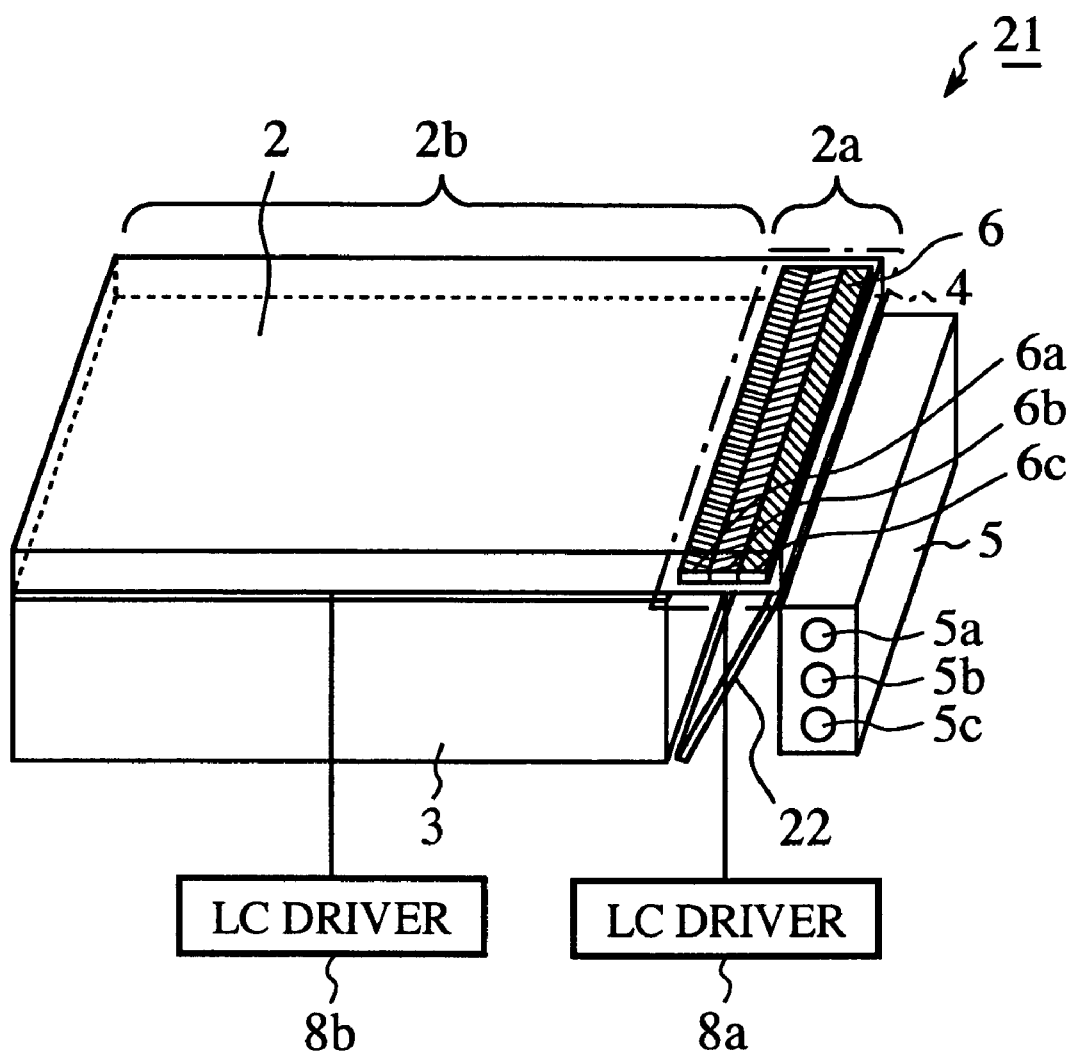
FIG. 6 is a perspective view showing a transmissive color liquid crystal display according to a second embodiment of the present invention.

FIG. 6 is a perspective view showing a transmissive color liquid crystal display according to a second embodiment of the present invention. In FIG. 6, numeral 21 depicts the transmissive color liquid crystal display 21 that includes a half-mirror 22 situated between a light-guiding element 3 and a light source unit 5. The inclined half-mirror 22 transmits internal rays emitted from the light source unit 5 and reflects external rays that have passed through an external-ray transmissive section 2a of a liquid crystal display panel assembly 2.

The light source unit 5 is located in the vicinity of the side end surface of the light-guiding element 3 and is located at the same side of the light-guiding element 3 as that where the external-ray transmissive section 2a of the liquid crystal display panel assembly 2 is positioned.

Other structural elements are the same as or equivalent to the structural elements identified by the same reference symbols as in FIG. 1, and therefore, will not be describe in detail.

In the second embodiment of the transmissive color liquid crystal display 21, internal rays emitted from the light source unit 5 pass through the half-mirror 22 and enter the light-guiding element 3 while external rays that have passed through the external-ray transmissive section 2a of the liquid crystal display panel assembly 2 are reflected by the half-mirror 22 and enter the light-guiding element 3.

With such a structure of the second embodiment, the bulk of internal rays emitted from the light source unit 5 does not get out from the fenestra 4. Accordingly, color images on the image display section 2b of the liquid crystal display panel assembly 2 can be prevented from darkening.

Third Embodiment

Figure 7:
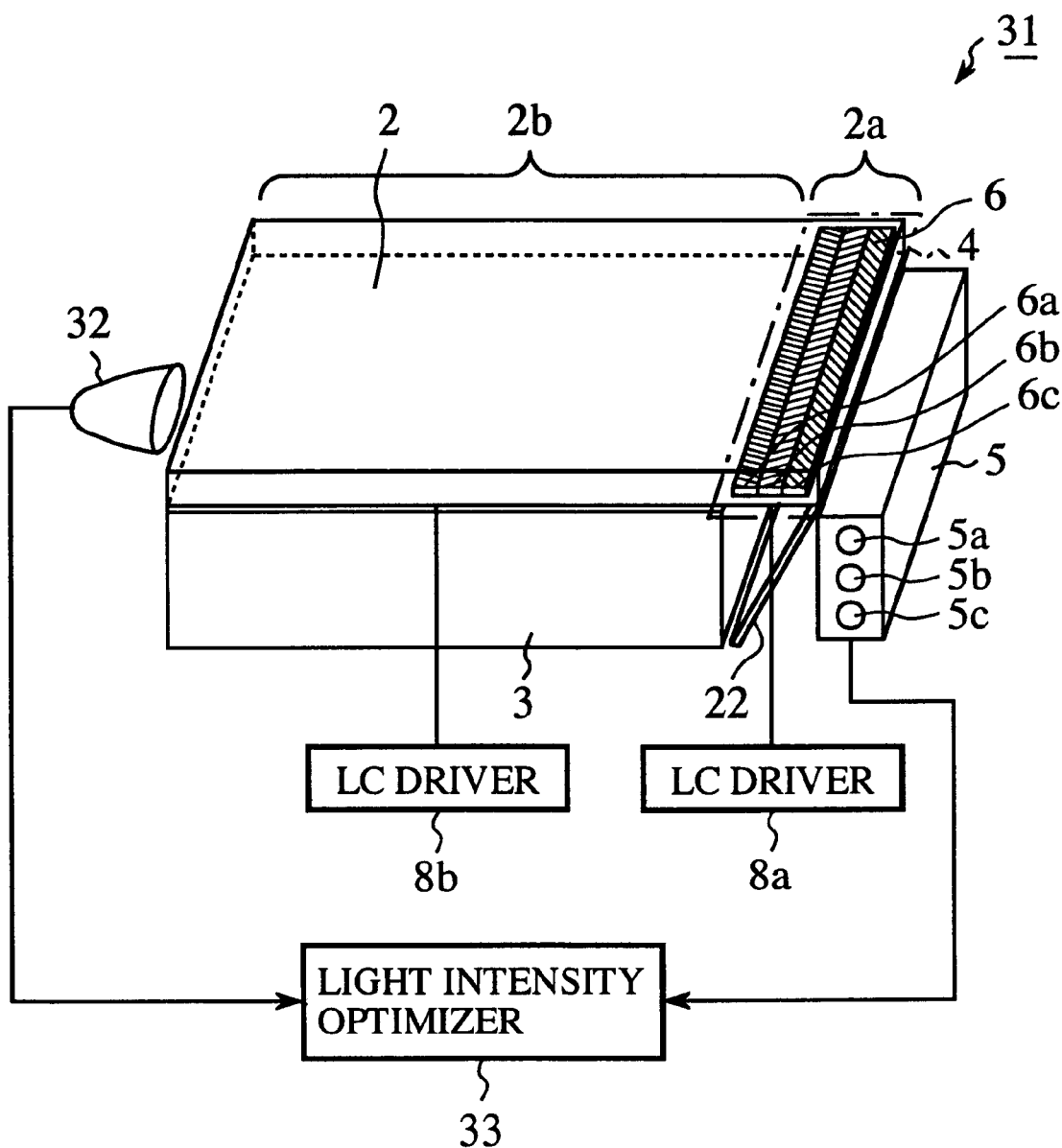
FIG. 7 is a perspective view showing a transmissive color liquid crystal display according to a third embodiment of the present invention.

FIG. 7 is a perspective view showing a transmissive color liquid crystal display according to a third embodiment of the present invention. In FIG. 7, numeral 31 denotes the transmissive color liquid crystal display including a light detector 32 that is arranged in the vicinity of the side end surface of a light-guiding element 3 opposing to the side where half-mirror 22 and the light source unit 5 are positioned.

The light detector 32 in place detects the sum of the intensity of internal rays and external rays within the light-guiding element 3. More exactly, the light detector 32 detects the intensity of each color-component light resulting from internal rays and external rays of the wavelength band indicated by each color-component data, such as R data, G data, and B data.

The output signal from the light detector 32 is supplied to a light intensity optimizer 33 that is connected with the light source unit 5 for controlling the voltage applied to each of the light sources 5a, 5b, and 5c of the light source unit 5.

Other structural elements are the same as or equivalent to the structural elements identified by the same reference symbols as in FIG. 6, and therefore, will not be describe in detail.

In accordance with the third embodiment of the transmissive color liquid crystal display 31, on the basis of the sum light intensity of each color measured by the light detector 32, the light intensity optimizer 33 controls the linear light sources 5a, 5b, or 5c corresponding to the color. By the above-mentioned control, the sum light intensity of internal and external rays of each color component, which are irradiated to the image display section 2b of the liquid crystal display panel assembly 2, is maintained constant although the intensity of external rays varies. For example, the light intensity optimizer 33 may include switches for incrementally adjusting respective voltage applied to the respective light sources 5a, 5b, and 5c, whereby the brilliance of color images on the image display section 2b of the liquid crystal display panel assembly 2 and power consumption may be selected readily.

Figure 8:
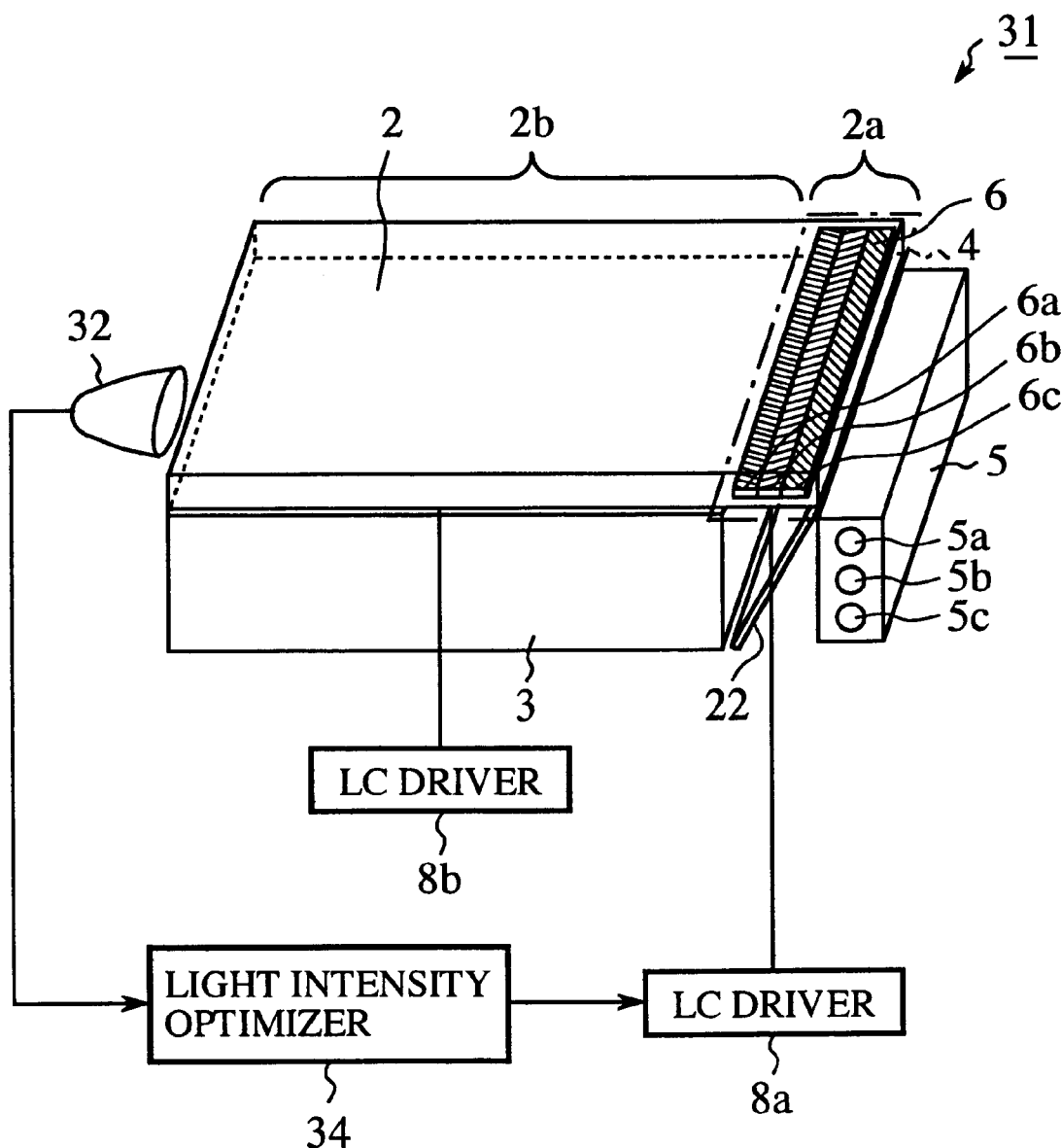
FIG. 8 is a perspective view showing a modification of the third embodiment of the present invention.

FIG. 8 shows a modification of the third embodiment. In this modification, the output signal from the light detector 32 is supplied to a light intensity optimizer 34 that is connected with the LC driver 8a for the external-ray transmissive section 2a of the liquid crystal display panel assembly 2 for controlling the voltage applied to the activated pixels on the external-ray transmissive section 2a of the liquid crystal display panel assembly 2.

Figure 9:
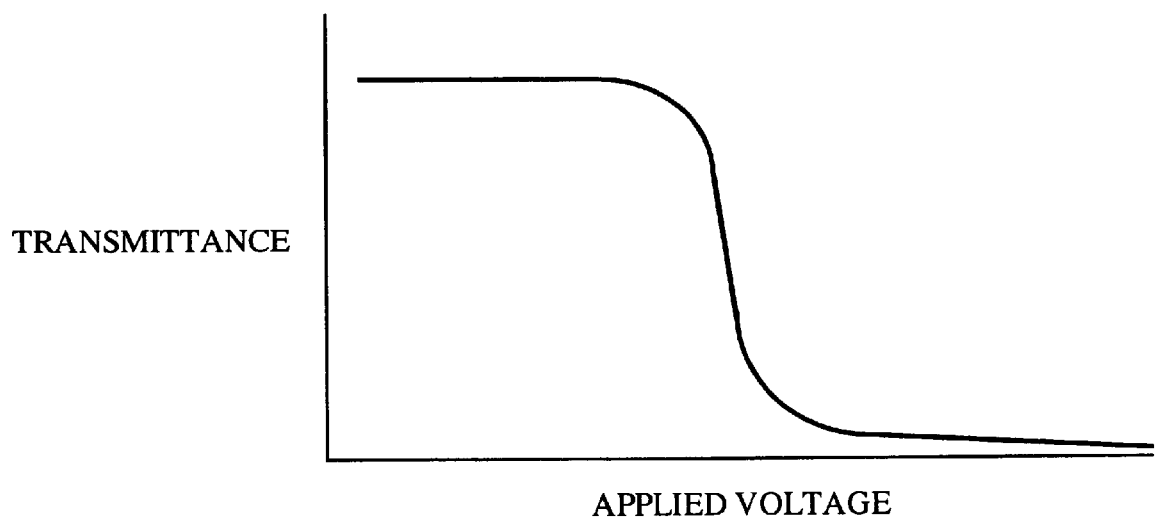
FIG. 9 is a graph showing transmittance-voltage relationship of a liquid crystal display.

In accordance with the modification, on the basis of the sum light intensity of each color measured by the light detector 32, the light intensity optimizer 34 controls the LC driver 8a for the external-ray transmissive section 2a. Consequently, the LC driver 8a adjusts the voltage applied to the activated pixels, covering the filters 6a, 6b, or 6c corresponding to the color, on the external-ray transmissive section 2a of the liquid crystal display panel 10 assembly 2. In this manner, the sum light intensity of internal and external rays of each color component, which are irradiated to the image display section 2b of the liquid crystal display panel assembly 2, are maintained constant although the intensity of external rays varies. The reason for adjusting the applied voltage is that the transmittance of a liquid crystal exhibits a relationship with applied voltage as shown in FIG. 9, so that adjusting the applied voltage may control the intensity of incident external rays.

With such a structure of the third embodiment, since the voltage applied to the constituent linear light source 5a, 5b, or 5c of the light source unit 5 or the voltage applied to the pixels on the external-ray transmissive section 2a of the liquid crystal display panel assembly 2 is controlled on the basis of the measurement of the sum light intensity resulting from internal and external rays of each color component within the light-guiding element 3, the sum light intensity resulting from internal and external rays of each color component may be kept constant.

Although the light detector 32 is situated in the vicinity of the side end surface of a light-guiding element 3 opposing to the side where half-mirror 22 and the light source unit 5 are positioned in the illustrated third embodiment, it is not intended to limit the present invention to the illustrative embodiment. The light detector 32 may be arranged at a position in front of the liquid crystal display panel assembly 2 or another position irradiated with the rays from the half-mirror 22 directly.

In another modification, the incident internal and external rays within the light-guiding element 3 may be introduced to the light detector 32 through a suitable waveguide, such as an optical fiver.

Fourth Embodiment

In the above-described first through third embodiments, the light source unit includes linear light sources. The light source unit, however, may include a plurality of point light sources, as in a fourth embodiment of the present invention, which will be described below.

Figure 10:
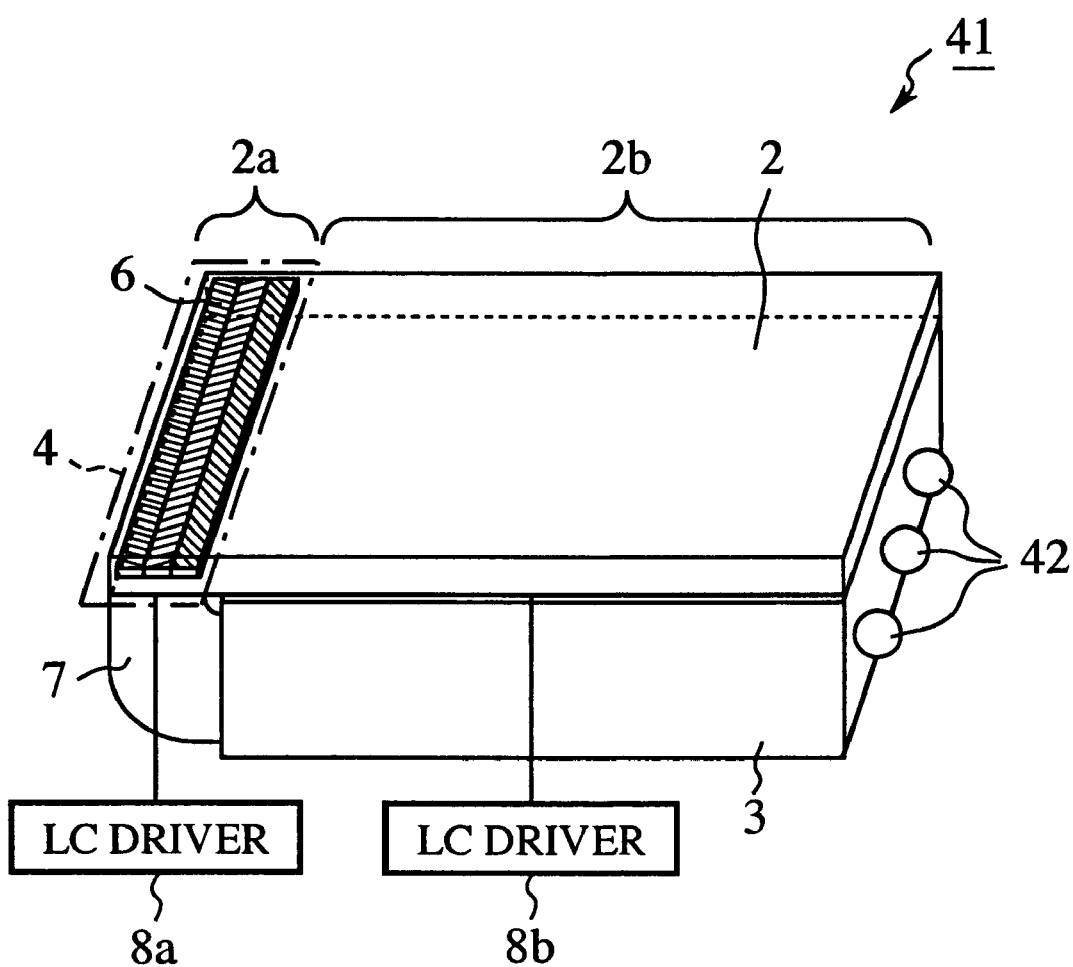
FIG. 10 is a perspective view showing a transmissive color liquid crystal display according to a fourth embodiment of the present invention.

FIG. 10 is a perspective view showing a transmissive color liquid crystal display according to the fourth embodiment of the present invention. In FIG. 10, numeral 41 designates the transmissive color liquid crystal display including three point light sources 42 situated in the vicinity of a side end surface of a light-guiding element 3.

The light sources 42 comprise point light sources capable of irradiating internal rays of which the wavelength bands correspond to color-component data extracted from full color image data. For example, the light sources 42 are comprised of an R (red) light source, a G (green) light source, and a B (blue) light source. The point light sources are preferably selected from an LED and an EL element. In accordance with the LED or EL element, the wavelength band of the rays emitted therefrom may be matched with a target wavelength band by controlling adulterants doped in the manufacturing process.

Other structural elements are the same as or equivalent to the structural elements identified by the same reference symbols as in FIG. 1, and therefore, will not be describe in detail.

With such a structure of the fourth embodiment, since the light sources 42 are comprised of point light sources, the size of device may be minimized and the cost in manufacturing the device may be reduced.

Fifth Embodiment

In the above-described first through third embodiments, the light source unit includes linear light sources. The light source unit, however, may include a plurality of surface light sources, as in a fifth embodiment of the present invention, which will be described below.

Figure 11:
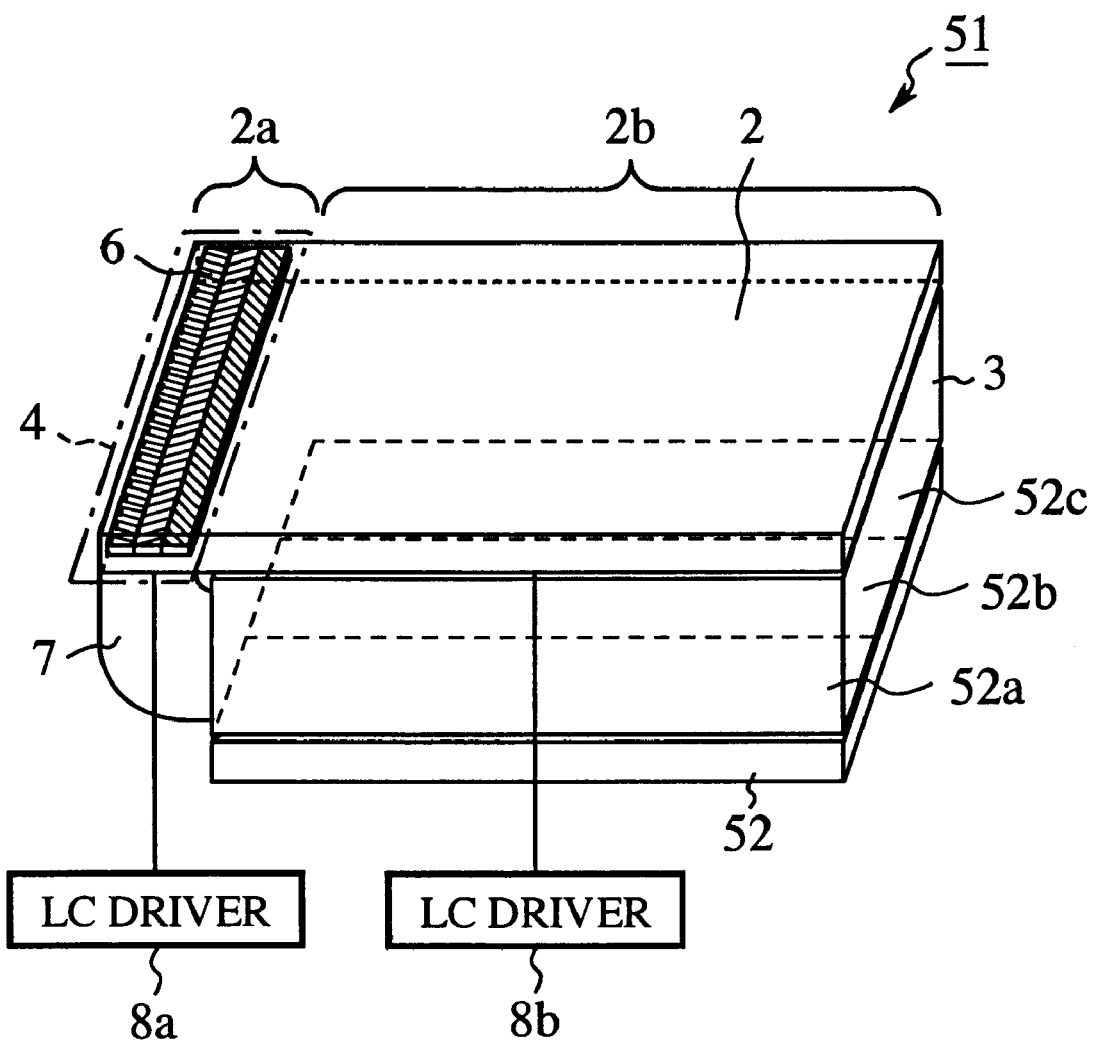
FIG. 11 is a perspective view showing a transmissive color liquid crystal display according to a fifth embodiment of the present invention.

FIG. 11 is a perspective view showing a transmissive color liquid crystal display according to a fifth embodiment of the present invention. In FIG. 11, numeral 51 identifies the transmissive color liquid crystal display that includes a light source unit 52 located behind the light-guiding element 3.

The light source unit 52 includes a plurality of surface light sources 52a, 52b, and 52c capable of irradiating internal rays of which the wavelength bands correspond to color-component data extracted from full color image data. For example, the light source unit 52 is comprised of an R (red) light source 52a, a G (green) light source 52b, and a B (blue) light source 52c. In the light source unit 52, such surface light sources 52a, 52b, and 52c are arrayed in the same plane. The surface light sources are preferably selected from an LED and an EL element. In accordance with the LED or EL element, the wavelength band of the rays emitted therefrom may be matched with a target wavelength band by controlling adulterants doped in the manufacturing process.

The light-guiding element 3 transmits internal rays emitted from the light source unit 52 and introduced through the rear surface of the element 3, and transmits external rays introduced from a external-ray transmissive section 2a of a liquid crystal display panel assembly 2 through an auxiliary light-guiding element 7 and a side end surface of the light-guiding element 3. External rays are oriented frontward during the transmission of internal and external rays within the light-guiding element 3, and both internal and external rays irradiate an image display section 2b of the liquid crystal display panel assembly 2 uniformly.

Other structural elements are the same as or equivalent to the structural elements identified by the same reference symbols as in FIG. 1, and therefore, will not be describe in detail.

By virtue of such a structure of the fifth embodiment, since the light source unit 52 includes surface light sources 52a, 52b, and 52c that have high brilliance, full color images can be displayed at an improved brightness when internal rays are exclusively employed to display full color images.

Sixth Embodiment

In the above-described first through five embodiments, external rays introduced through the external-ray transmissive section 2a and internal rays emitted from the light source unit enters the same light-guiding element 3 for irradiating the image display section 2b. However, different light-guiding elements may be used for guiding external and internal rays, respectively, as in a sixth embodiment of the present invention, which will be described below.

Figure 12:
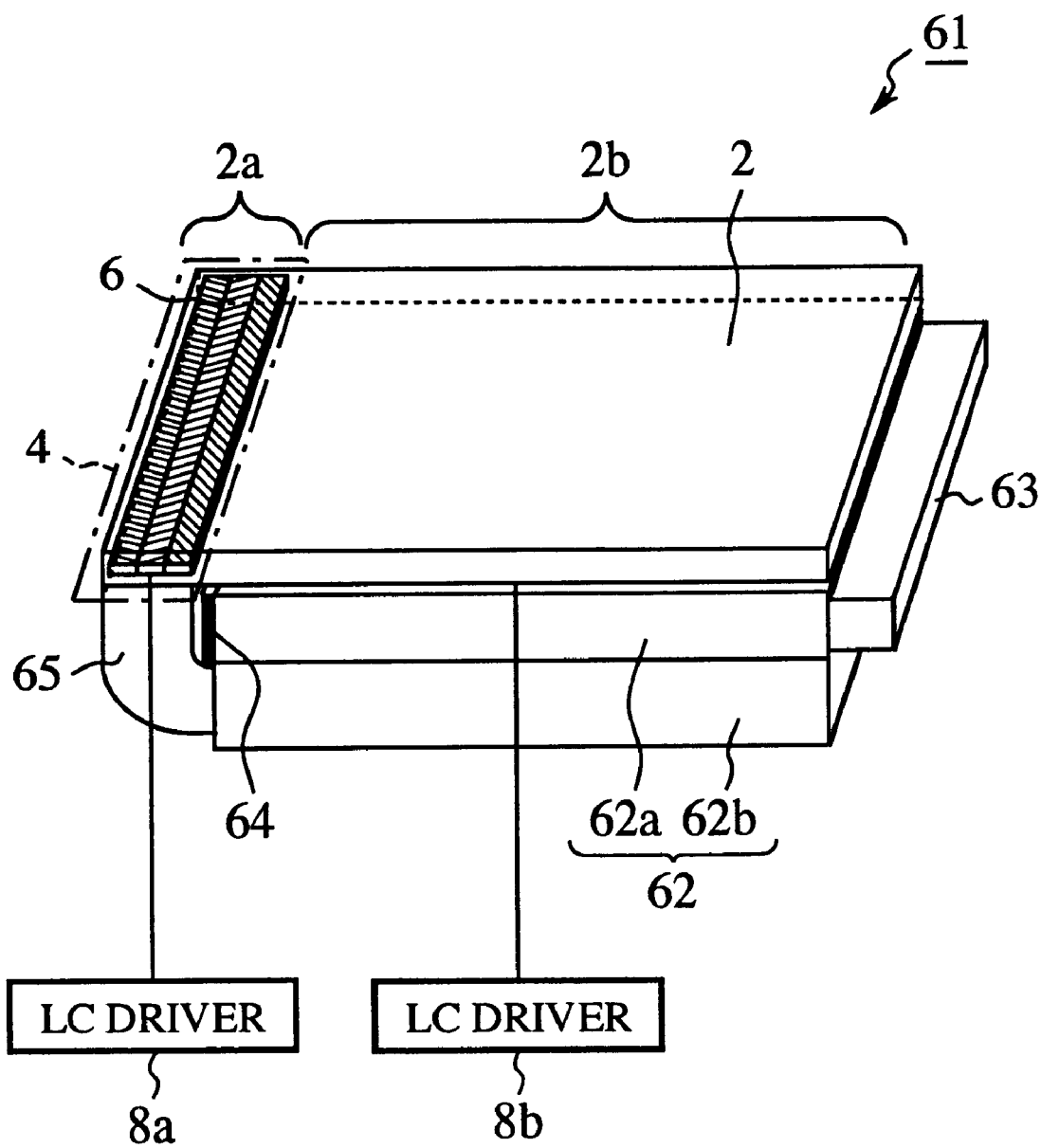
FIG. 12 is a perspective view showing a transmissive color liquid crystal display according to a sixth embodiment of the present invention.

FIG. 12 is a perspective view showing a transmissive color liquid crystal display according to a sixth embodiment of the present invention. In FIG. 12, numeral 61 indicates the transmissive color liquid crystal display comprising a light-guiding element 62 that is located behind a liquid crystal display panel assembly 2 and includes a first light-guiding element 62a and a second light-guiding element 62b. The first light-guiding element 62a is located closely to the liquid crystal display panel assembly 2 and the second light-guiding element 62b is located behind the first light-guiding element 62a.

A light source unit 63 is situated near a side end surface of the first light-guiding element 62a while a reflection film 64 is mounted on the other side end surface of the first light-guiding element 62a opposing to the side where the light source unit 63 is situated.

An auxiliary light-guiding element 65 is provided for introducing external rays admitted through an external-ray transmissive section 2a of the liquid crystal display panel assembly 2 to a side end surface of the second light-guiding element 62b.

The second light-guiding element 62b orients external rays, which have entered through the side end surface thereof, frontward. The first light-guiding element 62a transmits external rays, which have entered through the rear surface thereof, frontward and orients internal rays, which have entered through the side end surface thereof, frontward, whereby both external and internal rays irradiate an image display section 2b of the liquid crystal display panel assembly 2 uniformly.

The light source unit 63 includes a plurality of linear light sources or a plurality of point light sources, as similar to the embodiments previously described.

Other structural elements are the same as or equivalent to the structural elements identified by the same reference symbols as in FIG. 1, and therefore, will not be describe in detail.

According to the sixth embodiment of the transmissive color liquid crystal display 61, internal rays from the light source unit 63 are admitted to the first light-guiding element 62a, and then oriented frontward by the first light-guiding element 62a to irradiate the image display section 2b of the liquid crystal display panel assembly 2 uniformly. Although some fractions of internal rays progress longitudinally through the first light-guiding element 62a, the fractions of internal rays return to the first light-guiding element 62a by the reflection film 64 that prevents the fractions of internal rays from leaking out.

In addition, external rays admitted through the external-ray transmissive section 2a of the liquid crystal display panel assembly 2 are introduced through the auxiliary light-guiding element 65 to the second light-guiding element 62b and oriented frontward by the second light-guiding element 62b in accordance with the sixth embodiment of the transmissive color liquid crystal display 61. External rays then pass through the first light-guiding element 62a and irradiate the image display section 2b of the liquid crystal display panel assembly 2 uniformly.

Since external rays are typically much brighter than internal rays when external rays are employed, external rays can project full color images on the image display section 2b at a sufficient brightness even after passing through the first light-guiding element 62a. No reflection film is mounted on the dead-end side surface of the first light-guiding element 62a opposing to the second light-guiding element 62b from which external rays are introduced, so that external rays do not return to leak out through the fenestra 4.

Figure 13:
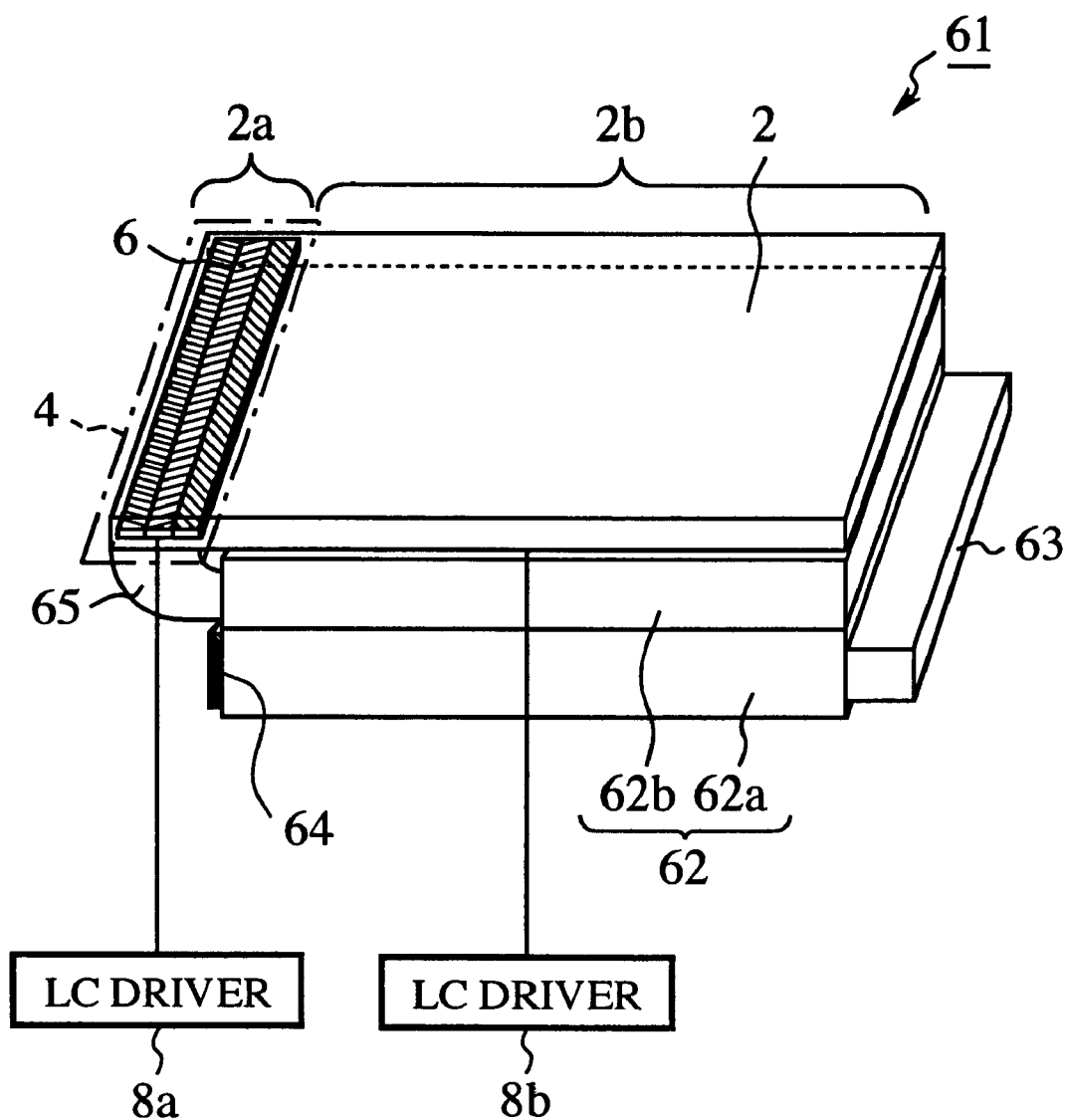
FIG. 13 is a perspective view showing a transmissive color liquid crystal display according to an alteration of the sixth embodiment of the present invention.

FIG. 13 illustrates an alteration of the sixth embodiment of the present invention. In the alteration of the transmissive color liquid crystal display 61, the positions of the first light-guiding element 62a for internal rays and the second light-guiding element 62b for external rays are interconverted. In this case, since the reflection film 64 returns internal rays, which have advanced longitudinally though the first light-guiding element 62a, no fractions of internal rays do not leak out, too. Additionally, no reflection film is mounted on the dead-side end surface of the first light-guiding element 62a opposing to the second light-guiding element 62b from which external rays are introduced, so that external rays do not return to leak out through the fenestra 4.

As mentioned above, in accordance with the sixth embodiment, the first light-guiding element 62a for internal rays and the second light-guiding element 62b for external rays are separately provided, and the reflection film 64 is mounted on the dead-end surface of the first light-guiding element 62a opposing to the side where the light source unit 63 is situated. Therefore, some fractions of internal rays, which have progressed longitudinally through the first light-guiding element 62a, return to the first light-guiding element 62a by the reflection film 64 that prevents the fractions of internal rays from leaking out. In other words, the transmission efficiency of internal rays can be enhanced advantageously.

When the first light-guiding element 62a for internal rays is disposed closely to the liquid crystal display panel assembly 2 in comparison with the second light-guiding element 62b as illustrated in FIG. 12, the bulk of internal rays is efficiently transmitted.

In contrast, when the second light-guiding element 62b for external rays is disposed closely to the liquid crystal display panel assembly 2 in comparison with the first light-guiding element 62a as illustrated in FIG. 13, the bulk of external rays is efficiently transmitted.

Seventh Embodiment

Figure 14:
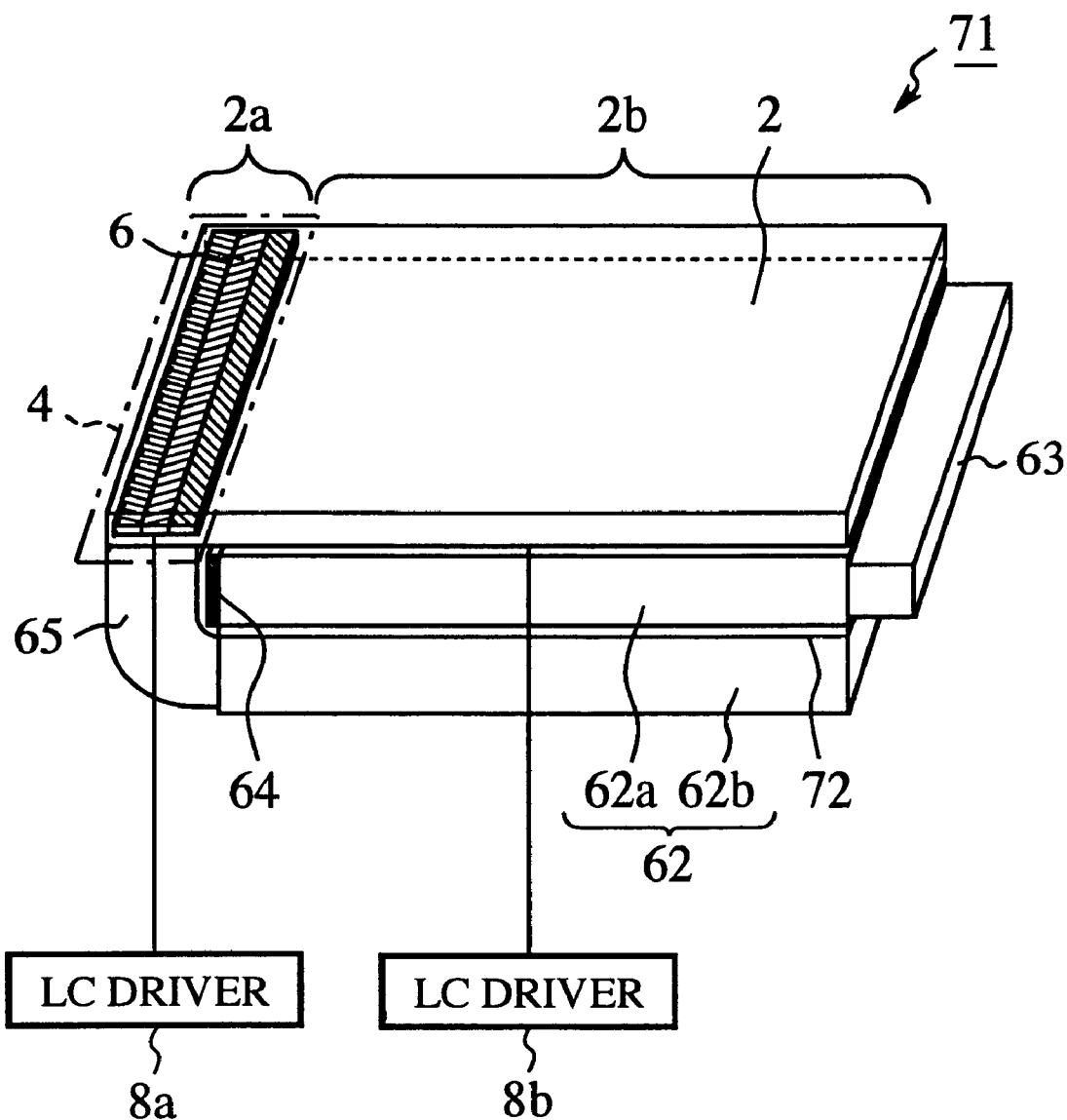
FIG. 14 is a perspective view showing a transmissive color liquid crystal display according to a seventh embodiment of the present invention.

FIG. 14 is a perspective view showing a transmissive color liquid crystal display according to a seventh embodiment of the present invention. In FIG. 14, numeral 71 designates the transmissive color liquid crystal display comprising a half-mirror 72 located between a first light-guiding element 62a and a second light-guiding element 62b. The half-mirror 72 reflects some fragments of internal rays within the first light-guiding element 62a disposed over the half-mirror 72 to the first light-guiding element 62a. The half-mirror 72 transmits external rays from the second light-guiding element 62b disposed behind the half-mirror 72 for orienting external rays toward the liquid crystal display panel assembly 2.

Other structural elements are the same as or equivalent to the structural elements identified by the same reference symbols as in FIG. 12, and therefore, will not be describe in detail.

In the seventh embodiment of the transmissive color liquid crystal display 71, although some fragments of internal rays within the first light-guiding element 62a progressing toward the second light-guiding element 62b, those fragments are reflected by the half-mirror 72, thereby being oriented toward the liquid crystal display panel assembly 2.

Therefore, by virtue of the half-mirror 72 between the first light-guiding element 62a and the second light-guiding element 62b, the transmission efficiency of internal rays is further improved in accordance with the seventh embodiment.

Figure 15:
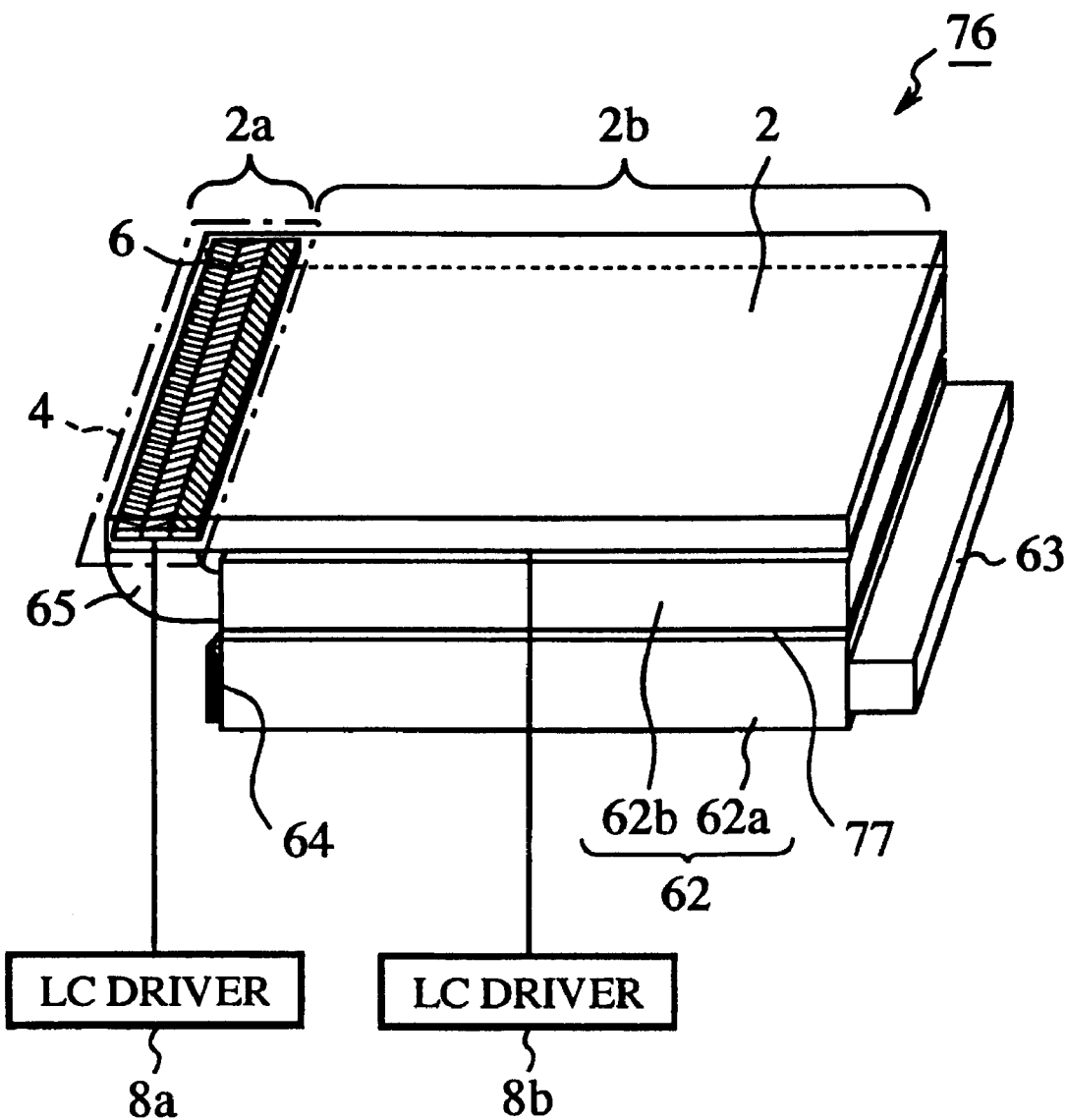
FIG. 15 is a perspective view showing a transmissive color liquid crystal display according to an alteration of the seventh embodiment of the present invention.

A similar half-mirror may be also applied to the embodiment shown in FIG. 13. FIG. 15 is a perspective view showing a transmissive color liquid crystal display 76 according to an alteration of the seventh embodiment of the present invention. The transmissive color liquid crystal display 76 has a similar structure to the embodiment in FIG. 13, but has a half-mirror 77 located between a first light-guiding element 62a and a second light-guiding element 62b. The half-mirror 77 reflects some fragments of external rays within the second light-guiding element 62b disposed over the half-mirror 77 to the second light-guiding element 62b. The half-mirror transmits internal rays from the first light-guiding element 62a disposed behind the half-mirror 77 toward the liquid crystal display panel assembly 2. The transmission efficiency of external rays is further improved in accordance with this modified arrangement.

Eighth Embodiment

Figure 16:
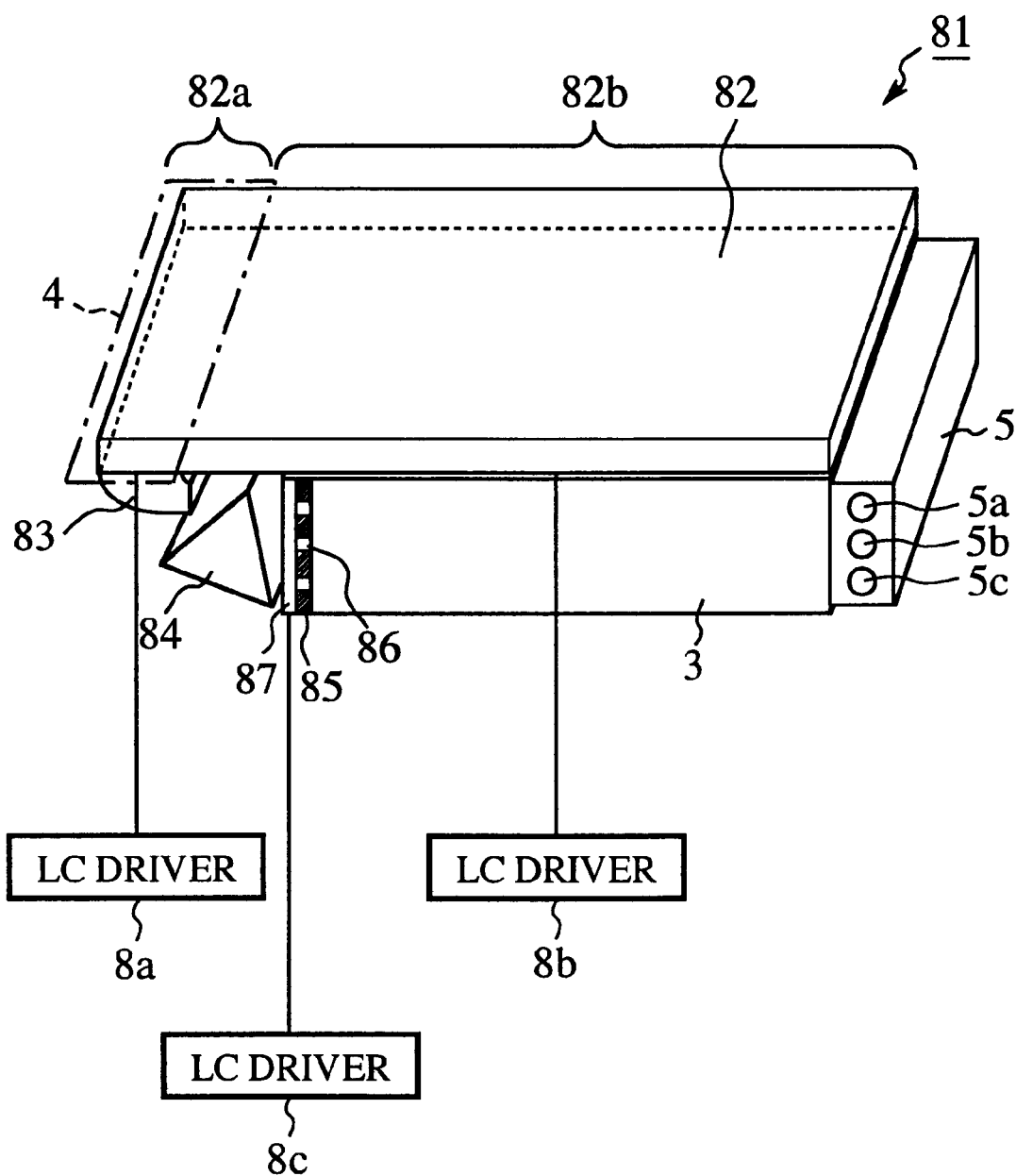
FIG. 16 is a perspective view showing a transmissive color liquid crystal display according to an eighth embodiment of the present invention.

FIG. 16 is a perspective view showing a transmissive color liquid crystal display according to an eighth embodiment of the present invention. In FIG. 16, numeral 81 denotes the transmissive color liquid crystal display including a liquid crystal display panel assembly 82; an auxiliary light-guiding element 83 for guiding external rays admitted through an external-ray transmissive section 82a of the liquid crystal display panel assembly 82 toward a side end surface of a light-guiding element 3 opposing to a side where a light source unit 5 is situated; and a prism 84 located between the auxiliary light-guiding element 83 and a liquid crystal panel 87 for dispersing external rays (white light) into visible spectrum.

A slit plate 85 is also provided at the side end surface of the light-guiding element 3 opposing to a side where the light source unit 5 is situated. The slit plate 85 is irradiated with the spectrum resulting from the dispersion of external rays by the prism 84. A plurality of slits or apertures 86 are pierced in the slit plate 85. The heights of the respective apertures 86 correspond to colored componental rays resulting from the dispersion of external rays by the prism 84. On a surface of the slit plate 85 facing to the prism 84, mounted is a liquid crystal panel 87 that covers at least the apertures 86.

The liquid crystal display panel assembly 82 may be separated into two sections: an external-ray transmissive section 82a, which faces to a fenestra 4 and through which external rays may pass; and an image display section 82b, on which color images may be presented. The external-ray transmissive section 82a and the image display section 82b are connected with and driven by respective liquid crystal (LC) drivers 8a and 8b.

The liquid crystal panel 87 may have a similar structure as the liquid crystal display panel assembly 82, but does not have a section for presenting an image to human eyes. The liquid crystal panel 87 is connected with and driven by another LC driver 8c.

Other structural elements are the same as or equivalent to the structural elements identified by the same reference symbols as in FIG. 1, and therefore, will not be describe in detail.

When external rays are employed in the eighth embodiment of the transmissive color liquid crystal display 81, the LC driver 8a for driving the external-ray transmissive section 82a activates all pixels on the external-ray transmissive section 82a of the liquid crystal display panel assembly 82, so as to make the external-ray transmissive section 82a transmissive with respect to external rays. Simultaneously, the LC driver 8c for driving the liquid crystal panel 87 selectively and cyclically activates pixels on the panel 87 facing to each aperture 86 of the slit plate 85 on the basis of input color-component data varying cyclically. However, at the same time, the LC driver 8c deactivates the other pixels on the liquid crystal panel 87. Accordingly, for an instant, only activated pixels facing to the single aperture 86 becomes transmissive and only external ray component having a single narrow wavelength band corresponding to the input color-component data can pass through the aperture 86.

For example, when R data is input into the liquid crystal driver 8b for driving the image display section 82b, the liquid crystal driver 8c for driving the liquid crystal panel 87 activates pixels, on which the aperture 86 receiving red rays from the prism 84 is disposed, to make these pixels transparent. At the same time, the liquid crystal driver 8c deactivates other pixels, on which the other apertures 86 are disposed, to make these pixels opaque.

When G data is input into the liquid crystal driver 8b, the liquid crystal driver 8c activates pixels, on which the aperture 86 receiving green rays from the prism 84 is disposed, to make these pixels transparent. At the same time, the liquid crystal driver 8c deactivates other pixels, on which the other apertures 86 are disposed, to make these pixels opaque.

When B data is input into the liquid crystal driver 8b, the liquid crystal driver 8c activates pixels, on which the aperture 86 receiving blue rays from the prism 84 is disposed, to make these pixels transparent. At the same time, the liquid crystal driver 8c deactivates other pixels, on which the other apertures 86 are disposed, to make these pixels opaque.

Accordingly, only a single narrow wavelength band of external rays among the spectrum resulting from dispersion by the prism 84 may pass through the corresponding aperture 86 in the slit plate 85 and be admitted in the light-guiding element 3 at a time.

Thus, in accordance with the eighth embodiment, a color image may be displayed at an improved chroma. Resultantly, the full color images by the effect of afterimage can exhibit an improved reality.

The wavelength bands of external rays admitted in the light-guiding element 3 depend upon the positions or heights of the apertures 86.

Therefore, it is possible to readily vary the wavelengths of the incoming external rays for various color-component data when the design of the device should be changed.

It is preferable that concerning the same colors (wavelengths), the positions or heights of the apertures 86 are symmetrical to that of the linear light sources 5a, 5b, and 5c of the light source unit 5 with respect to the light-guiding element 3 of a rectangular parallelepiped shape, more exactly, with respect to the center plane of the light-guiding element 3 that is parallel to the side end surfaces through which internal and external rays are introduced. For example, the height of the aperture 86, through which red external rays pass, is preferably the same as the height of the red light source 5a.

With such an arrangement, concerning the same colors, the routes of internal rays within the light-guiding element 3 toward the liquid crystal display panel assembly 82 can be symmetrical to the routes of external rays within the light-guiding element 3 toward the liquid crystal display panel assembly 82 with respect to the center plane. Therefore, the design of the light-guiding element 3 may be simplified.

Although a plurality of micro pixels on the liquid crystal panel 87 are activated and deactivated for varying the color to be realized according to the eighth embodiment, it is not intended to limit the present invention to the control of the micro pixels. Rather, it can be contemplated that larger pixels, each of which has substantially the same superficial content as the apertures 86 of the slit plate 85, cover the apertures 86, respectively. In this alteration, one of the large-sized pixels may be selectively activated for transmitting a required color while the others are deactivated for an instant. By this arrangement, fall of the aperture ration raised by a large number of pixels may be prevented.

Ninth Embodiment

In the above-described eighth embodiment, a single wavelength (or a narrow wavelength band) of external rays among the spectrum resulting from dispersion by the prism may be selectively utilized at a time. However, a single broader wavelength band of external rays among the spectrum resulting from dispersion by the prism may be selectively utilized at a time, as in a ninth embodiment of the present invention, which will be described below.

Figure 17:
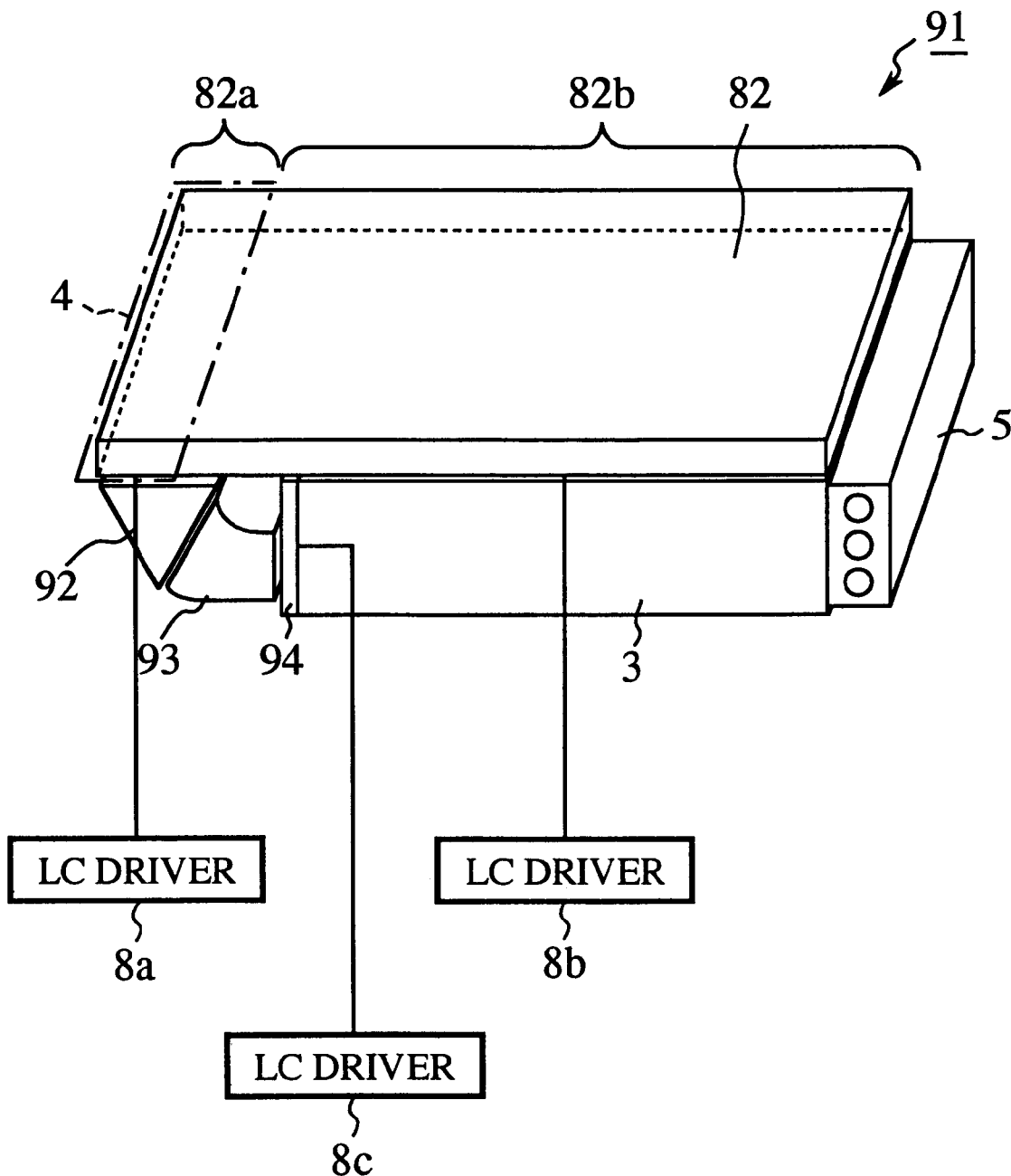
FIG. 17 is a perspective view showing a transmissive color liquid crystal display according to a ninth embodiment of the present invention.
Figure 18:
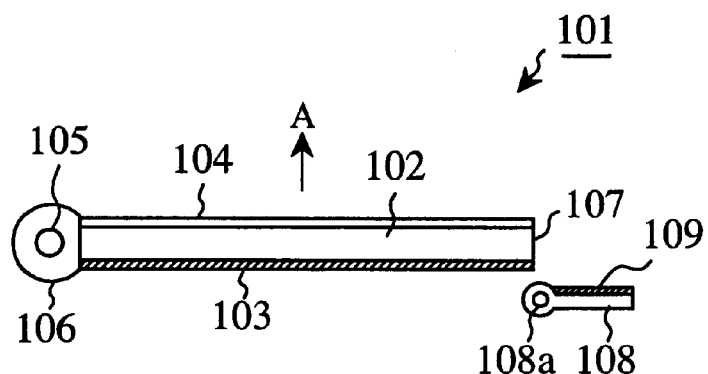
FIG. 18 is a cross sectional view of a backlight used in a conventional transmissive liquid crystal display.
Figure 19:
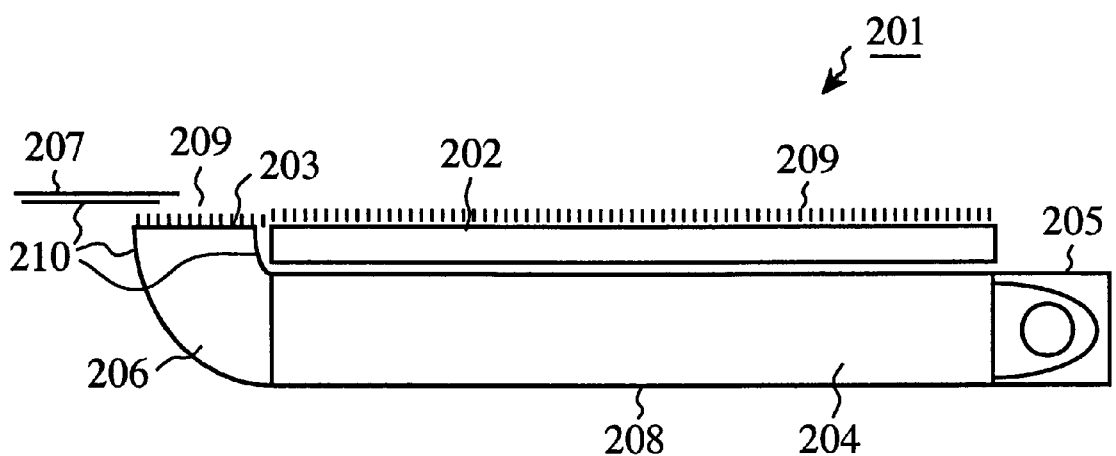
FIG. 19 is a cross sectional view of another conventional transmissive liquid crystal display.

FIG. 17 is a perspective view showing a transmissive color liquid crystal display according to the ninth embodiment of the present invention. In FIG. 17, numeral 91 denotes the transmissive color liquid crystal display comprising a prism 92 for dispersing external rays (white light), which have been admitted through an external-ray transmissive section 2a of a liquid crystal display panel assembly 2, into visible spectrum. The transmissive color liquid crystal display 91 further includes an auxiliary light-guiding element 93 for guiding the dispersed spectrum obtained by the prism 92 toward a side end surface of a light-guiding element 3 opposing to a side where a light source unit 5 is situated. The transmissive color liquid crystal display 91 further includes a liquid crystal panel 94 provided at the side end surface of the light-guiding element 3 opposing to a side where a light source unit 5 is situated.

The dispersed spectrum resulting from external rays by the prism 92 strikes the liquid crystal panel 94. The liquid crystal panel 94 may have a similar structure as the liquid crystal display panel assembly 82, but does not have a section for presenting an image to human eyes. The liquid crystal panel 94 is connected with and driven by an LC driver 8c.

Other structural elements are the same as or equivalent to the structural elements identified by the same reference symbols as in FIG. 16, and therefore, will not be describe in detail.

When external rays are employed in the ninth embodiment of the transmissive color liquid crystal display 91, the LC driver 8a for driving the external-ray transmissive section 82a activates all pixels on the external-ray transmissive section 82a of the liquid crystal display panel assembly 82, so as to make the external-ray transmissive section 82a transmissive with respect to external rays. Simultaneously, the LC driver 8c for driving the liquid crystal panel 94 selectively and cyclically activates/deactivates pixels on the liquid crystal panel 94 on the basis of input color-component data varying cyclically, whereby external rays with a wavelength corresponding to the input color-component data are admitted through the liquid crystal panel 94. Accordingly, for an instant, only activated pixels become transmissive and only external ray component having a single wavelength band corresponding to the input color-component data can pass through the liquid crystal panel 94.

For example, when R data is input into the liquid crystal driver 8b for driving the image display section 82b, the liquid crystal driver 8c for driving the liquid crystal panel 94 activates pixels struck by red rays from the prism 92 to make these pixels transparent. At the same time, the liquid crystal driver 8c deactivates other pixels on the liquid crystal panel 94 to make these pixels opaque.

When G data is input into the liquid crystal driver 8b, the liquid crystal driver 8c activates pixels struck by green rays from the prism 92 to make these pixels transparent. At the same time, the liquid crystal driver 8c deactivates other pixels on the liquid crystal panel 94 to make these pixels opaque.

When B data is input into the liquid crystal driver 8b, the liquid crystal driver 8c activates pixels struck by blue rays from the prism 92 to make these pixels transparent. At the same time, the liquid crystal driver 8c deactivates other pixels on the liquid crystal panel 94 to make these pixels opaque.

Accordingly, only a single wavelength band of external rays among the spectrum resulting from dispersion by the prism 92 may be admitted into the light-guiding element 3 through the liquid crystal panel 94 at a time.

In accordance with the ninth embodiment, since the LC driver 8c selectively activates/deactivates pixels on the liquid crystal panel 94 in order that only a single wavelength band of external rays resulting from dispersion by the prism 92 may penetrate the liquid crystal panel 94 and be admitted in the light-guiding element 3 at a time, the intensity and wavelength band of external rays admitted to the light-guiding element 3 may be controlled readily.

Preferably, the auxiliary light-guiding element 93 comprises a plurality of layers capable of transmitting rays of respective wavelength bands. When the spectrum obtained by dispersion of external rays by the prism 92 is transmitted through the auxiliary light-guiding element 93 to the light-guiding element 3, rays of each wavelength band pass through one of the layers in the auxiliary light-guiding element 93. Therefore, it is possible to prevent colors from being mixed with one another before rays reach the light-guiding element 3.

Although a plurality of micro pixels on the liquid crystal panel 94 are activated and deactivated for varying the color to be realized according to the eighth embodiment, it is not intended to limit the present invention to the control of the micro pixels. Rather, it can be contemplated that larger pixels, each of which defines a required wavelength band, may be provided in the liquid crystal panel 94. In this alteration, one of the large-sized pixels may be selectively activated for transmitting a required color while the others are deactivated for an instant. By this arrangement, fall of the aperture ration raised by a large number of pixels may be prevented.

While the present invention has been particularly shown and described with references to preferred embodiments thereof, it will be understood by those skilled in the art that various changes in form and details may be made therein without departing from the spirit and scope of the invention as defined by the claims. Such variations, alterations, and modifications are intended to be encompassed in the scope of the claims.

What is claimed is:

1. A transmissive color liquid crystal display comprising:
    a first liquid crystal section for presenting color images;
    a light-guiding element situated behind the first liquid crystal section for orienting rays toward the first liquid crystal section;
    a second liquid crystal section including a plurality of zones capable of transmitting wavelength bands of external rays, respectively, the zones being selectively activated for introducing colored external rays through respective zones to the light-guiding element;
    a first liquid crystal driver for controlling the first liquid crystal section, color-component data extracted from full color image data being input into the first liquid crystal driver in a time-division manner, the first liquid crystal driver activating and deactivating pixels on the first liquid crystal section for presenting images on the first liquid crystal display section on the basis of the color-component data in time division manner; and
    a second liquid crystal driver for controlling the second liquid crystal section, the second liquid crystal driver selectively activating the zones in the second liquid crystal section in time division manner for introducing colored external rays of which wavelength bands correspond to the color-component data through the zone to the light-guiding element for irradiating the images on the first liquid crystal section with the colored external rays in time division manner.

2. The transmissive color liquid crystal display according to claim 1, wherein the first and second liquid crystal sections are parts of a single liquid crystal display panel assembly, the zones of the second liquid crystal sections being respectively provided with color filters capable of selectively transmitting color components of external rays, each of the color components having a wavelength band corresponding to the color-component data, whereby one of the color components are admitted through one of the zones and one of the color filters on the zone when the zone is activated by the second liquid crystal driver.

3. The transmissive color liquid crystal display according to claim 1, further comprising a prism for dispersing external rays into visible spectrum exhibiting color components, the spectrum resulting from external rays by the prism striking the second liquid crystal section, whereby one of the color components are admitted through one of the zones of the second liquid crystal section when the zone is activated by the second liquid crystal driver.

4. The transmissive color liquid crystal display according to claim 3, further comprising a slit plate facing to the second liquid crystal section, the slit plate being provided with a plurality of apertures of which the positions respectively correspond to the zones of the second liquid crystal section, whereby one of the color components are admitted through one of the apertures and one of the zones of the second liquid crystal section when the zone is activated by the second liquid crystal driver.

5. The transmissive color liquid crystal display according to claim 3, further comprising a third liquid crystal section activated for introducing external rays through the third liquid crystal section to the prism, and a third liquid crystal driver for controlling the third liquid crystal section, the first and third liquid crystal sections being parts of a single liquid crystal display panel assembly.

6. The transmissive color liquid crystal display according to claim 1, further comprising a light source unit disposed near the light-guiding element, the light source unit capable of emitting colored internal rays, of which wavelength bands correspond to the color-component data, introduced to the light-guiding element for irradiating the images on the first liquid crystal section with the colored external rays in a time division manner.

7. The transmissive color liquid crystal display according to claim 6, further comprising a battery charge monitor for detecting remaining charge of a battery for driving the transmissive color liquid crystal display, and an external-ray controller for controlling to use external rays when the battery charge monitor detects that the remaining charge is less than the threshold.

8. The transmissive color liquid crystal display according to claim 2, further comprising a light source unit and a half-mirror, the light source unit being positioned at the same side of the light-guiding element as that where the second liquid crystal section is positioned, the light source unit being disposed near the light-guiding element, the light source unit capable of emitting colored internal rays, of which wavelength bands correspond to the color-component data, introduced to the light-guiding element for irradiating the images on the first liquid crystal section with the colored external rays in a time division manner, the half-mirror being situated between the light-guiding element and the light source unit, the half-mirror reflecting external rays, which have passed through the second liquid crystal section, toward the light-guiding element and transmitting internal rays emitted from the light source unit toward the light-guiding element.

9. The transmissive color liquid crystal display according to claim 6, further comprising a light detector for measuring a sum of intensity of internal rays and external rays of each color component within the light-guiding element, and a light intensity optimizer for controlling the light source unit on the basis of the sum of the intensity measured by the light detector, so as to adjust the intensity of internal rays.

10. The transmissive color liquid crystal display according to claim 6, further comprising a light detector for measuring a sum of intensity of internal rays and external rays of each color component within the light-guiding element, and a light intensity optimizer for controlling the second liquid crystal section on the basis of the sum of the intensity measured by the light detector, so as to adjust the intensity of introduced external rays.

11. The transmissive color liquid crystal display according to claim 6, wherein the light-guiding element includes a first light-guiding element, to which internal rays are admitted, and a second light-guiding element, to which external rays are admitted, the transmissive color liquid crystal display further comprising a reflection film mounted on a side end surface of the first light-guiding element opposing to a side to which internal rays are admitted.

12. The transmissive color liquid crystal display according to claim 11, wherein the first liquid crystal section is situated in front of the first light-guiding element while the first light-guiding element is situated in front of the second light-guiding element.

13. The transmissive color liquid crystal display according to claim 11, wherein the first liquid crystal section is situated in front of the second light-guiding element while the second light-guiding element is situated in front of the first light-guiding element.

14. The transmissive color liquid crystal display according to claim 12, further comprising a half-mirror situated between the first light-guiding element and the second light-guiding element, the half-mirror reflecting internal rays admitted to the first light-guiding element and transmitting external rays admitted to the second light-guiding element.

15. The transmissive color liquid crystal display according to claim 13, further comprising a half-mirror situated between the first light-guiding element and the second light-guiding element, the half-mirror reflecting external rays admitted to the second light-guiding element and transmitting internal rays admitted to the first light-guiding element.

16. The transmissive color liquid crystal display according to claim 6, wherein the light source unit includes a plurality of linear light sources.

17. The transmissive color liquid crystal display according to claim 6, wherein the light source unit includes a plurality of point light sources.

18. The transmissive color liquid crystal display according to claim 6, wherein the light source unit includes a plurality of surface light sources.

19. A transmissive color liquid crystal display comprising:
a liquid crystal display panel assembly including an image display section for presenting color images and an external-ray transmissive section activated for transmitting external rays rearward;
a light-guiding element situated behind the image display section and the external-ray transmissive section for orienting rays introduced through the external-ray transmissive section toward the image display section;
a first liquid crystal driver for controlling the image display section, color-component data extracted from full color image data being input into the first liquid crystal driver in a time-division manner, the first liquid crystal driver activating and deactivating pixels on the image display section for presenting images on the image display section on the basis of the color-component data in time division manner;
a second liquid crystal driver for activating the external-ray transmissive section for introducing external rays through the external-ray transmissive section; and
a color selecting mechanism for selecting colors of external rays in time division manner for introducing colored external rays of which wavelength bands correspond to the color-component data to the light-guiding element for irradiating the images on the image display section with the colored external rays in time division manner.

* * * * *